United States Patent
Kobayashi et al.

(10) Patent No.: US 9,885,580 B2
(45) Date of Patent: Feb. 6, 2018

(54) NAVIGATION APPARATUS, SIMULATION APPARATUS, MOVING DEVICE AND NAVIGATION METHOD

(71) Applicant: YAMAHA HATSUDOKI KABUSHIKI KAISHA, Iwata-shi, Shizuoka-ken (JP)

(72) Inventors: Yuichi Kobayashi, Hamamatsu (JP); Yuji Hiramatsu, Iwata (JP); Hokuto Fujii, Iwata (JP); Tsuyoshi Kamiya, Iwata (JP)

(73) Assignee: YAMAHA HATSUDOKI KABUSHIKI KAISHA, Iwata-shi, Shizuoka-ken (JP)

( * ) Notice: Subject to any disclaimer, the term of this patent is extended or adjusted under 35 U.S.C. 154(b) by 76 days.

(21) Appl. No.: 14/904,257

(22) PCT Filed: Jun. 17, 2014

(86) PCT No.: PCT/JP2014/003250
§ 371 (c)(1),
(2) Date: Jan. 11, 2016

(87) PCT Pub. No.: WO2015/004855
PCT Pub. Date: Jan. 15, 2015

(65) Prior Publication Data
US 2016/0169694 A1    Jun. 16, 2016

(30) Foreign Application Priority Data
Jul. 11, 2013   (JP) .................................. 2013-145891

(51) Int. Cl.
*G01C 22/00*   (2006.01)
*G01C 21/34*   (2006.01)
(Continued)

(52) U.S. Cl.
CPC ......... *G01C 21/3453* (2013.01); *G01C 21/14* (2013.01); *G01S 19/42* (2013.01);
(Continued)

(58) Field of Classification Search
CPC ..... G01C 21/3453; G01C 21/14; G01S 19/42; G05D 1/0088; G05D 1/0231
(Continued)

(56) References Cited

U.S. PATENT DOCUMENTS 5,436,839 A   7/1995   Dausch et al.
6,167,332 A   12/2000  Kurtzberg et al.
(Continued)

FOREIGN PATENT DOCUMENTS

EP   1962162 A2   8/2008
JP   H05-100029 A   4/1993
(Continued)

OTHER PUBLICATIONS

Teppei Saitoh and Yoji Kuroda, (Mar. 31, 2009) "FastSLAM based Global Path Planning Strategy in Unknown Environment", research report by department of science and technology of Meiji University, department of science and technology of Meiji University, No. 40, pp. 1-8 (English Abstract is included).
(Continued)

*Primary Examiner* — Thomas G Black
*Assistant Examiner* — Luke Huynh
(74) *Attorney, Agent, or Firm* — Rabin & Berdo, P.C.

(57) ABSTRACT

A navigation method for a navigating apparatus of a moving device, including obtaining weight information that includes a plurality of weight coefficients and storing the weight information, detecting one or a plurality of paths through which the moving device is capable of moving, acquiring information regarding a position of a destination with respect to the moving device as destination positional information, acquiring information regarding characteristics of topography in surroundings of the moving device as topographical characteristics information, calculating worth correlation information regarding the one or plurality of
(Continued)

detected paths to the destination using the acquired destination positional information, the acquired topographical characteristics information and the stored weight information, and estimating a worth score of each of the one or plurality of paths to the destination based on the calculated worth correlation information.

12 Claims, 13 Drawing Sheets

(51) Int. Cl.
    *G05D 1/02*         (2006.01)
    *G01C 21/14*     (2006.01)
    *G01S 19/42*      (2010.01)
    *G05D 1/00*         (2006.01)

(52) U.S. Cl.
    CPC ......... *G05D 1/0088* (2013.01); *G05D 1/0231* (2013.01); *G05D 2201/0207* (2013.01)

(58) Field of Classification Search
    USPC ..................................... 701/25, 33.4, 3, 533
    See application file for complete search history.

(56) References Cited

U.S. PATENT DOCUMENTS

| | | | | |
|---|---|---|---|---|
| 8,306,684 B2* | 11/2012 | Nakano | ................... | G05D 1/024 700/258 |
| 9,043,072 B1* | 5/2015 | Tisdale | .................. | G05D 1/021 701/28 |
| 2012/0239240 A1* | 9/2012 | Nakano | ................ | G05D 1/0274 701/25 |
| 2016/0306359 A1* | 10/2016 | Lindhe | ................. | G05D 1/0221 |

FOREIGN PATENT DOCUMENTS

| | | |
|---|---|---|
| JP | H07-64634 A | 3/1995 |
| JP | 3150018 B2 | 3/2001 |
| JP | 2003-141692 A | 5/2003 |
| JP | 2010-191502 A | 9/2010 |
| JP | 2010-225126 A | 10/2010 |

OTHER PUBLICATIONS

Extended European Search Report in the counterpart European patent application (14823449.5), dated Feb. 8, 2017.

* cited by examiner

F I G. 13
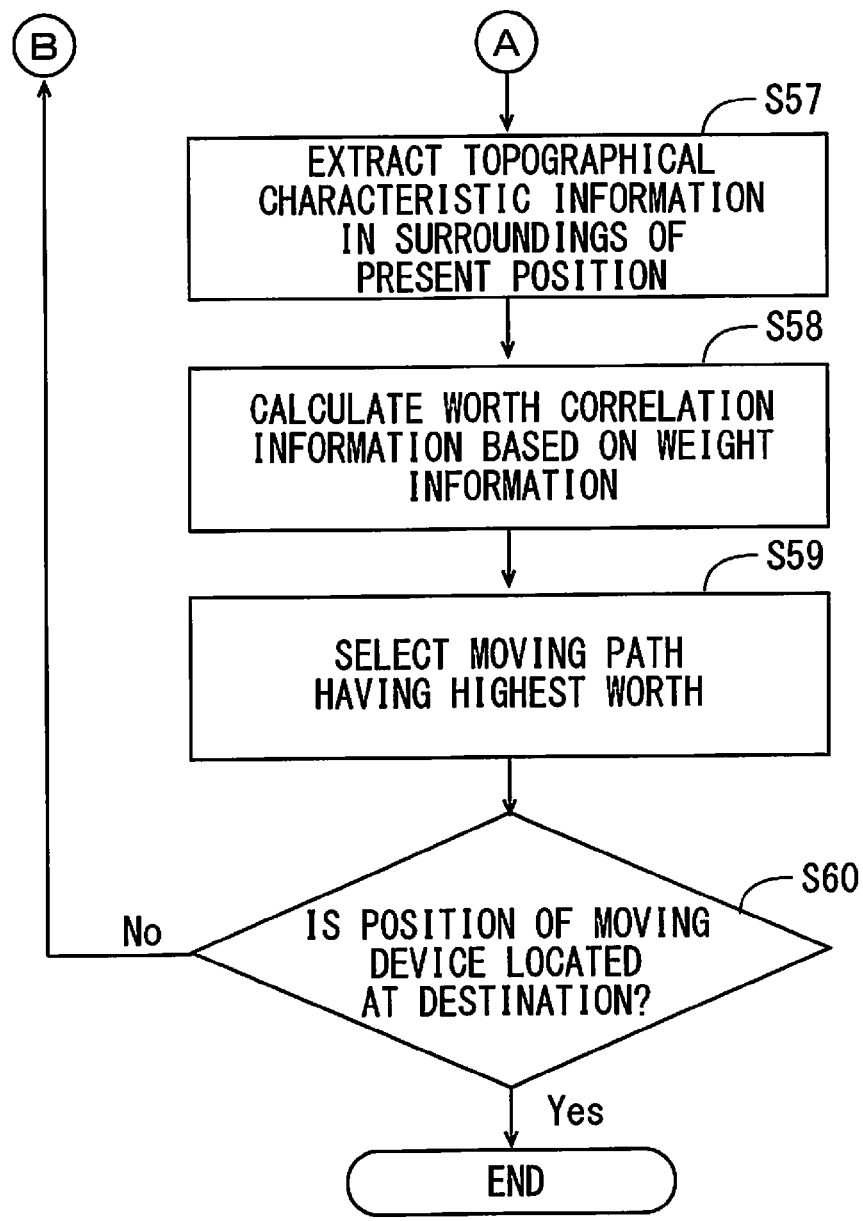

NAVIGATION APPARATUS, SIMULATION APPARATUS, MOVING DEVICE AND NAVIGATION METHOD

BACKGROUND OF THE INVENTION

Technical Field

The present invention relates to a navigation apparatus, a simulation apparatus, a moving device and a navigation method.

Background Art

In farms, disaster sites or the like, autonomous moving devices that do not require driving or operating by drivers are sometimes used. Even in a situation where there is no prior information of a path, such a moving device is required to be capable of autonomously moving from an arbitrary point to a destination. In Teppei Saitoh and Yoji Kuroda, "FastSLAM based Global Path Planning Strategy in Unknown Environment", research report by department of science and technology of Meiji University, department of science and technology of Meiji University, No. 40, pp. 1-8 (31 Mar. 2009; hereinafter "Saitoh"), an autonomous moving robot capable of autonomously moving from a predetermined start point to a predetermined finish point is described.

SUMMARY OF THE INVENTION

Technical Problem

Even when no prior information such as that of obstacles is supplied, the autonomous moving robot described in Saitoh utilizes self-position estimation and map construction to perform a path planning. However, when there is no prior information of a path, the autonomous moving robot described in Saitoh is likely to encounter a dead end on the path. In this case, the autonomous moving robot must turn back and cannot efficiently move to the finish point.

An object of the present invention is to provide a navigation apparatus capable of efficiently moving a moving device to a destination even when there is no prior information of a path, and a moving device including the navigation apparatus, and a navigation method.

Another object of the present invention is to provide a simulation apparatus capable of generating weight information used to estimate worth (value) of a path to a destination in a navigation apparatus capable of efficiently moving a moving device to the destination even when there is no prior information of the path.

Solution to Problem (1) According to one aspect of the present invention, a navigation apparatus carried in a moving device includes a path detector that detects one or a plurality of paths through which the moving device is capable of moving, a destination positional information acquirer that acquires information regarding a position of a destination with respect to the moving device as destination positional information, a topographical characteristics information acquirer that acquires information regarding characteristics of topography in surroundings of the moving device as topographical characteristics information, a storage portion that stores weight information including a plurality of weight coefficients respectively corresponding to the destination positional information and the topographical characteristic information and for calculating information that correlates with worth of the path to the destination from the destination positional information and the topographical characteristics information as worth correlation information, and a worth estimator that calculates the worth correlation information regarding the one or plurality of paths detected by the path detector to the destination from the destination positional information acquired by the destination positional information acquirer and the topographical characteristics information acquired by the topographical characteristics acquirer based on the weight information stored in the storage portion, and estimates worth of the one or plurality of paths to the destination based on the calculated worth correlation information.

In this navigation apparatus, the one or plurality of paths through which the moving device are capable of moving are detected. Further, the destination positional information regarding the position of the destination with respect to the moving device is acquired. The topographical characteristics information regarding the characteristics of the topography in the surroundings of the moving device is acquired.

The weight information for calculating the worth correlation information that correlates with the worth of the path to the destination from the destination positional information and the topographical characteristics information is stored in advance. Here, the weight information includes the plurality of weight coefficients respectively corresponding to the destination positional information and the topographical characteristics information.

The worth correlation information regarding the one or plurality of detected paths to the destination is calculated from the acquired destination positional information and topographical characteristics information based on the stored weight information. The worth of the one or plurality of paths to the destination is estimated based on the calculated worth correlation information.

This configuration enables estimation of the worth of the one or plurality of paths to the destination even when there is no prior information of the path. The moving device can reach the destination at a high probability by moving through the path estimated to have high worth. Thus, even when there is no prior information of the path, the navigation apparatus can efficiently move the moving device to the destination.

(2) The plurality of weight coefficients in the weight information may be calculated by a canonical correlation analysis using a plurality of destination positional information regarding a position of an arbitrary destination with respect to an arbitrary point, a plurality of topographical characteristics information regarding characteristics of topography in surroundings of the arbitrary point and worth of each of the plurality of paths that is acquired in advance in virtual topography including the plurality of paths.

In this case, the plurality of destination positional information, the plurality of topographical characteristics information and the worth of each of the plurality of paths to the destination are acquired using the virtual topography including the plurality of paths. Thus, the plurality of destination positional information, the plurality of topographical characteristics information and the worth of each of the plurality of paths to the destination of arbitrary topography can be easily acquired, and the weight coefficient of the arbitrary topography can be easily calculated.

(3) A first function that includes the plurality of destination positional information regarding the position of the arbitrary destination with respect to the arbitrary point and the plurality of topographical characteristics information regarding the characteristics of the topography in the surroundings of the arbitrary point in the virtual topography including the plurality of paths as a plurality of first variables and includes a plurality of first coefficients respectively corresponding to the plurality of first variables may be set, a second function that includes worth of each of the plurality of paths to the destination in the virtual topography as one or a plurality of second variables and includes one or a plurality of second coefficients respectively corresponding to the one or plurality of second variables may be set, and numerical values of the plurality of first coefficients and numerical values of the one or plurality of second coefficients may be determined such that a correlation between a numerical value of the first function and a numerical value of the second function is maximum, and the weight information may include the determined numerical values of the plurality of first coefficients as the plurality of weight coefficients.

In this case, the determined first coefficient is used, so that reliability of the worth correlation information regarding the one or plurality of paths to the destination calculated from the destination positional information and the topographical characteristics information in an actual path is improved. Thus, the reliability of the estimated worth of the one or plurality of paths to the destination can be improved.

(4) The navigation apparatus may further include a path selector that selects a path having highest worth of the worth estimated by the worth estimator.

In this case, the moving device moves through the path estimated to have the highest worth. Thus, the moving device can reach the destination through the best path. As a result, even when there is no prior information of the path, the navigation apparatus can more efficiently move the moving device to the destination.

(5) The navigation apparatus may further include an operation portion operated by a user in order to designate the position of the destination, and a position orientation sensor that receives positioning information of the moving device from a global positioning system, wherein the destination positional information acquirer may acquire the destination positional information based on the position of the destination designated by the operation portion and the positioning information of the moving device received from the position orientation sensor. In this case, the destination positional information can be easily and accurately acquired.

(6) The navigation apparatus may further include an environment recognition sensor that measures a first number of points in surroundings of the moving device, wherein the path detector may detect the one or plurality of paths through which the moving device is capable of moving based on the first number of information of measurement respectively corresponding to the first number of points by the environment recognition sensor, and the topographical characteristics information acquirer may extract a second number, smaller than the first number, of information of measurement of the one or plurality of paths from the first number of the information of measurement as the topographical characteristics information.

In this case, the number of dimensions of the plurality of topographical characteristics information is decreased from the first number to the second number. Thus, it is possible to quickly estimate the worth of the one or plurality of paths to the destination without largely reducing reliability.

(7) The environment recognition sensor may include a laser range finder. In this case, the first number of points can be measured with a simple configuration.

(8) High worth of the path to the destination may include shortness of a moving time period during which the moving device moves through the path. In this case, the navigation apparatus can move the moving device to the destination in a short period of time.

(9) High worth of the path to the destination may include a small amount of energy consumption by which the moving device moves through the path. In this case, the navigation apparatus can move the moving device to the destination with a small amount of energy consumption.

(10) According to another aspect of the present invention, a simulation apparatus that generates weight information used to estimate worth of a path to a destination in the navigation apparatus according to the one aspect of the present invention includes a storage portion that stores topographical data indicating virtual topography including a plurality of paths, a virtual moving device capable of traveling on the plurality of paths in the virtual topography indicated by the topographical data stored in the storage portion, a worth calculator that acquires worth of each of the plurality of paths by moving the moving device from an arbitrary point to an arbitrary destination in the virtual topography and calculates worth of a most suitable path to the arbitrary destination based on the acquired worth of each of the plurality of paths, an information acquirer that acquires a plurality of destination positional information regarding a position of the arbitrary destination with respect to the arbitrary point and a plurality of topographical characteristics information regarding characteristics of topography in surroundings of the arbitrary point in the virtual topography, and a weight information calculator that calculates the weight information for calculating worth correlation information that correlates with worth of the path to the destination by a canonical correlation analysis based on worth of a most suitable path calculated by the worth calculator regarding each of the plurality of destinations and the plurality of destination positional information and the plurality of topographical characteristic information that are acquired by the information acquirer, wherein the weight information includes a plurality of weight coefficients respectively corresponding to the destination positional information and the topographical characteristics information.

In this simulation apparatus, the topographical data indicating the virtual topography including the plurality of paths is stored. The virtual moving device can travel on the plurality of paths in the virtual topography indicated by the stored topographical data. The moving device is moved from an arbitrary point to an arbitrary destination in the virtual topography, so that the worth of each of the plurality of paths is acquired, and the worth of the most suitable path to the arbitrary destination is calculated based on the acquired worth of each of the plurality of paths. The plurality of destination positional information regarding the position of the arbitrary destination with respect to the arbitrary point and the plurality of topographical characteristics information regarding the topographical characteristics in surroundings of the arbitrary point in the virtual topography are acquired.

The weight information for calculating the worth correlation information that correlates with the worth of the path to the destination is calculated by the canonical correlation analysis based on the worth of the most suitable path calculated regarding each of the plurality of destinations and the plurality of acquired destination positional information and the plurality of acquired topographical characteristics information. Here, the weight information includes the plurality of weight coefficients respectively corresponding to the destination positional information and the topographical characteristics information.

In the navigation apparatus, the weight information calculated by the simulation apparatus is stored. The worth correlation information regarding the one or plurality of detected paths to the destination is calculated from the acquired destination positional information and topographical characteristics information based on the stored weight information. The worth of the one or plurality of paths to the destination is estimated based on the calculated worth correlation information.

This configuration enables estimation of the worth of the one or plurality of paths to the destination even when there is no prior information of the path. The moving device can reach the destination at a high probability by moving through the path estimated to have high worth. Thus, even when there is no prior information of the path, the navigation apparatus can efficiently move the moving device to the destination.

Further, even when there is no prior information of the path, the simulation apparatus can generate the weight information used to estimate the worth of the path to the destination in the navigation apparatus capable of efficiently moving the moving device to the destination.

(11) According to yet another aspect of the present invention, an autonomous moving device includes a main body configured to be movable, and the navigation apparatus according the one aspect of the present invention carried in the main body, and a controller that controls movement of the main body based on worth of each path to a destination estimated by the navigation apparatus.

In this autonomous moving device, the above-mentioned navigation apparatus is carried in the main body. The main body moves based on the worth of each path to the destination estimated by the navigation apparatus. This configuration causes the autonomous moving device to include the above-mentioned navigation apparatus, so that the autonomous moving device can efficiently move to the destination even when there is no prior information of the path.

(12) According to yet another aspect of the present invention, a navigation method for navigating a moving device includes the steps of storing weight information that includes a plurality of weight coefficients respectively corresponding to destination positional information and topographical characteristics information and for calculating information that correlates with worth of a path to a destination from the destination positional information and the topographical characteristics information as worth correlation information, detecting one or a plurality of paths through which the moving device is capable of moving, acquiring information regarding a position of a destination with respect to the moving device as the destination positional information, acquiring information regarding characteristics of topography in surroundings of the moving device as the topographical characteristics information, and calculating the worth correlation information regarding the one or plurality of detected paths to the destination from the acquired destination positional information and the acquired topographical characteristics information based on the stored weight information, and estimating worth of the one or plurality of paths to the destination based on the calculated worth correlation information.

In this navigation method, the one or plurality of paths through which the moving device can move are detected. Further, the destination positional information regarding the position of the destination with respect to the moving device is acquired. The topographical characteristics information regarding the characteristics of the topography in the surroundings of the moving device is acquired.

The weight information for calculating the worth correlation information that correlates with the worth of the path to the destination from the destination positional information and the topographical characteristics information is stored in advance. Here, the weight information includes the plurality of weight coefficients respectively corresponding to the destination positional information and the topographical characteristics information.

The worth correlation information regarding the one or plurality of detected paths to the destination is calculated from the acquired destination positional information and topographical characteristics information based on the stored weight information. The worth of the one or plurality of paths to the destination is estimated based on the calculated worth correlation information.

This configuration enables estimation of the worth of the one or plurality of paths to the destination even when there is no prior information of the path. The moving device can reach the destination at a high probability by moving through the path estimated to have high worth. Thus, even when there is no prior information of the path, the navigation method can efficiently move the moving device to the destination.

Advantageous Effects of Invention

The present invention enables the moving device to efficiently move to the destination even when there is no prior information of the path. Further, even when there is no prior information, the weight information used to estimate the worth of the path to the destination in the navigation apparatus capable of efficiently moving the moving device to the destination can be generated.

BRIEF DESCRIPTION OF THE DRAWINGS

FIG. 13 is a flow chart showing the navigation process by the navigation apparatus.

DETAILED DESCRIPTION OF THE INVENTION

(1) Overall Configuration of the Navigation Apparatus and the Moving Device

The navigation apparatus and the moving device according to one embodiment of the present invention will be described below with reference to drawings. The moving device is an autonomous moving device that is used in a farm, a disaster site or the like and does not require driving and operating by a driver.

Figure 1:
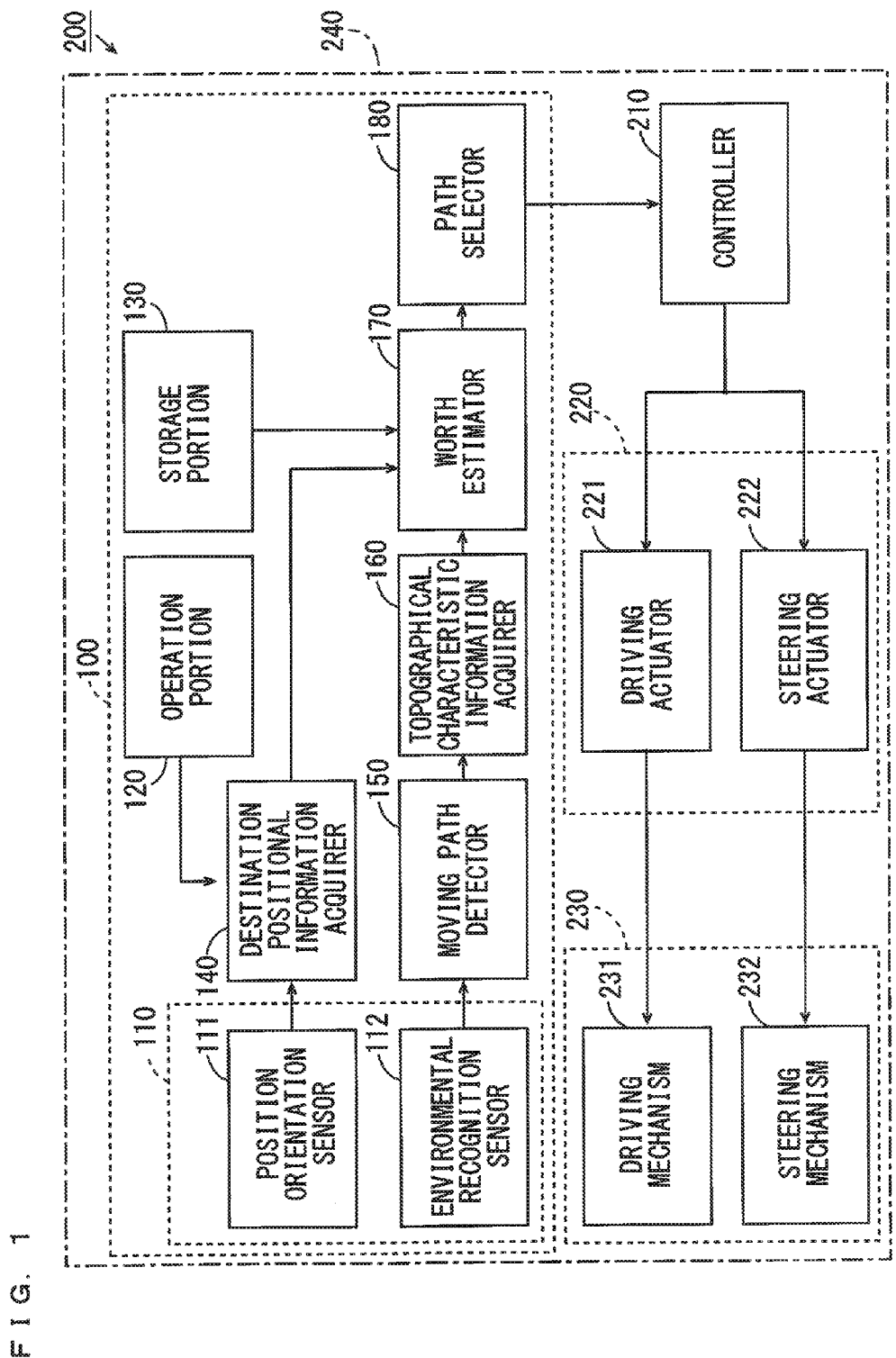
FIG. 1 is a block diagram showing one example of configurations of a moving device according to one embodiment of the present invention.
Figure 2A:
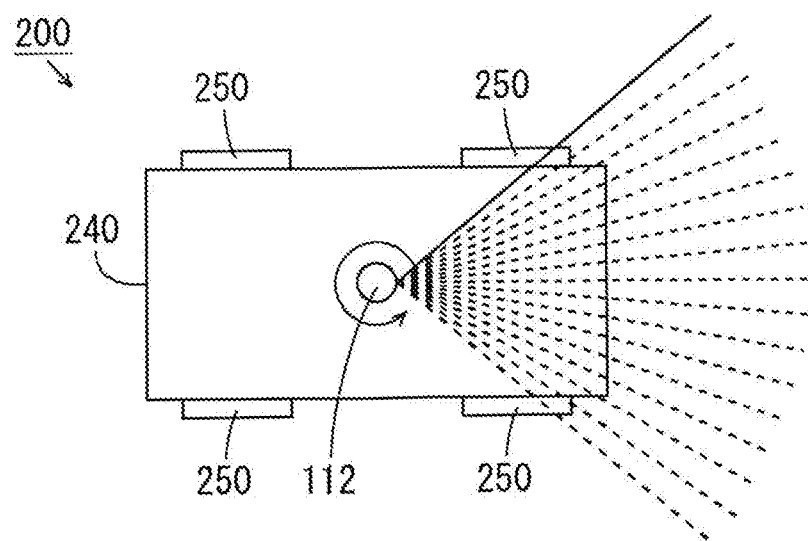
FIG. 2 is a schematic diagram showing an appearance of the moving device.
Figure 2B:
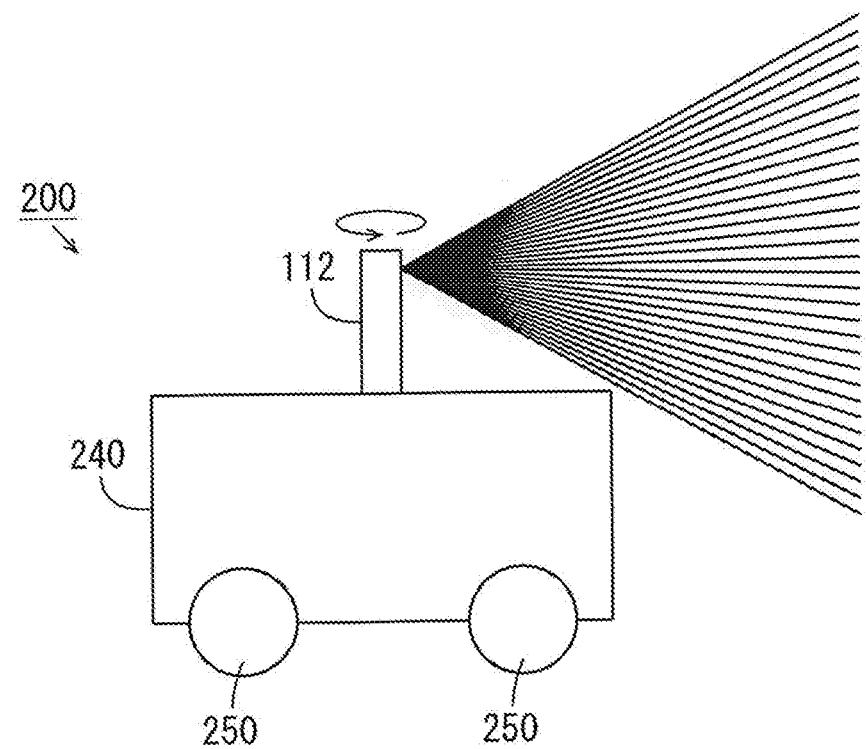

FIG. 1 is a block diagram showing one example of configurations of the moving device according to one embodiment of the present invention. FIG. 2 is a schematic diagram showing an appearance of the moving device. FIG. 2(a) shows a plan view of the moving device, and FIG. 2(b) shows a side view of the moving device. As shown in FIG. 1, the moving device 200 includes the navigation apparatus 100, a controller 210, an actuator portion 220, a moving mechanism portion 230, a vehicle body 240 and wheels 250 (FIG. 2). As shown in FIG. 2(a), in the present embodiment, the moving device 200 is a UGV (Unmanned Ground Vehicle) including the four wheels 250.

The navigation apparatus 100 includes a sensor portion 110, an operation portion 120 and a storage portion 130. Further, the navigation apparatus 100 includes a destination positional information acquirer 140, a path detector 150, a topographical characteristics information acquirer 160, a worth (value) estimator 170 and a path selector 180. The destination positional information acquirer 140, the path detector 150, the topographical characteristics information acquirer 160, the worth estimator 170 and the path selector 180 are realized by a CPU (Central Processing Unit) and a computer program, for example.

The sensor portion 110 includes a position orientation sensor 111 and an environment recognition sensor 112. The position orientation sensor 111 receives positioning information and orientation information of the moving device 200 from a GPS (Global Positioning System), an INS (Inertial Navigation System) and an IMU (Inertial Measurement Unit). The positioning information includes a position, a velocity and acceleration of the moving device 200. Further, the orientation information includes an orientation of the vehicle body 240. The position orientation sensor 111 supplies the received positioning information and orientation information of the moving device 200 to the destination positional information acquirer 140.

The environment recognition sensor 112 is an LRF (Laser Range Finder), for example. As shown in FIG. 2(b), the environment recognition sensor 112 sequentially emits a plurality (32 in the present example) of laser light beams in a top-and-bottom direction of the moving device 200 at predetermined angular intervals. In this state, as shown in FIG. 2(a), the environment recognition sensor 112 rotates about an axis extending in the top-and-bottom direction of the vehicle body 240. Thus, the environment recognition sensor 112 sequentially emits the plurality of laser light beams towards surroundings of the vehicle body 240 at the predetermined angular intervals.

The environment recognition sensor 112 measures a plurality of points in surroundings of the moving device 200 by detecting light beams reflected by objects in the surroundings. In the present example, the environment recognition sensor 112 emits about 64,000 laser light beams per second towards the surroundings of the vehicle body 240. Therefore, the environment recognition sensor 112 measures points of 64,000 locations in the surroundings of the moving device 200. The environment recognition sensor 112 supplies measurement information of the plurality of points to the path detector 150.

The operation portion 120 of FIG. 1 includes a user interface. A user can designate a position of a destination by operating the operation portion 120. The operation portion 120 supplies the position of the destination designated by the user to the destination positional information acquirer 140.

The destination positional information acquirer 140 estimates a position and an orientation of the moving device 200 based on the positioning information and the orientation information of the moving device 200. Further, the destination positional information acquirer 140 acquires the position of the destination with respect to the moving device 200 as destination positional information based on the estimated position of the moving device 200 and the designated position of the destination. The destination positional information has 3 dimensions. The destination positional information acquirer 140 supplies the destination positional information to the worth estimator 170.

The path detector 150 detects one or a plurality of paths through which the moving device 200 can move based on the measurement information of the plurality of points by the environment recognition sensor 112. The path detector 150 supplies the detected paths to the topographical characteristics information acquirer 160.

The topographical characteristics information acquirer 160 selects measurement information on the path from the measurement information of the plurality of points by the environment recognition sensor 112 and extracts the measurement information as topographical characteristics information. The topographical characteristics information indicates topographical characteristics in the surroundings of the moving device 200. In the present example, topographical characteristics information of 16 locations on the path is extracted from the measurement information of the points of the 64,000 locations. That is, the topographical characteristics information has 16 dimensions. The topographical characteristics information acquirer 160 supplies the topographical characteristics information to the worth estimator 170.

The storage portion 130 is a hard disc, for example. Weight information is stored in the storage portion 130 in advance. The weight information includes a plurality of weight coefficients respectively corresponding to the destination positional information and the topographical characteristics information. The weight information is the information that makes a link between the destination positional information and the topographical characteristics information, and weight correlation information correlating with worth of the path to the destination. The worth estimator 170 acquires the weight information stored in the storage portion 130.

Here, the worth of the path to the destination may be a moving time period or energy consumption. When the worth of the path to the destination is the moving time period, the shorter the moving time period is when the moving device 200 moves through the path, the higher the worth of the path to the destination is. Therefore, the navigation apparatus 100 can move the moving device 200 to the destination in a short period of time by selecting a path having high worth.

When the worth of the path to the destination is the energy consumption, the smaller an amount of the energy consumption is when the moving device 200 moves through the path, the higher the worth of the path to the destination is. Therefore, the navigation apparatus 100 can move the moving device 200 to the destination with a small amount of energy consumption by selecting a path having high worth.

The worth estimator 170 calculates information that correlates with worth regarding one or a plurality of paths to the destination as worth correlation information from the destination positional information and the topographical characteristics information based on the weight information. Further, the worth estimator 170 estimates worth of the one or plurality of paths to the destination based on the calculated worth correlation information. The worth estimator 170 supplies the worth of the one or plurality of paths to the destination to the path selector 180.

The path selector 180 selects a path having the highest worth of the worth estimated by the worth estimator 170. The path selector 180 supplies information indicating the selected path to the controller 210.

The controller 210 is an ECU (Electronic Control Unit), for example. The actuator portion 220 includes a driving system actuator 221 and a steering system actuator 222. The moving mechanic portion 230 includes a driving mechanism 231 and a steering mechanism 232. The driving system 231 includes a throttle valve and a brake, for example. Further, the steering mechanism 232 includes steering, for example. The driving system actuator 221 and the steering system actuator 222 are connected to the driving mechanism 231 and the steering mechanism 232, respectively.

The controller 210 controls the driving system actuator 221 and the steering actuator 222 such that the moving device 200 moves through the path selected by the path selector 180. The driving system actuator 221 adjusts an opening of the throttle valve and an amount of operation of the brake of the driving mechanism 231, for example, based on the control by the controller 210. Further, the steering system actuator 222 operates the steering of the steering mechanism 232, for example. Thus, the moving device 200 can move through the path selected by the path selector 180 to the destination.

In this case, the moving device 200 moves through the path estimated to have the highest worth. Thus, the moving device 200 can reach the destination through the best path. As a result, the navigation apparatus 100 can more efficiently move the moving device 200 to the destination even when there is no prior information of the path.

(2) Basic Configuration of the Simulation Apparatus

Figure 3:
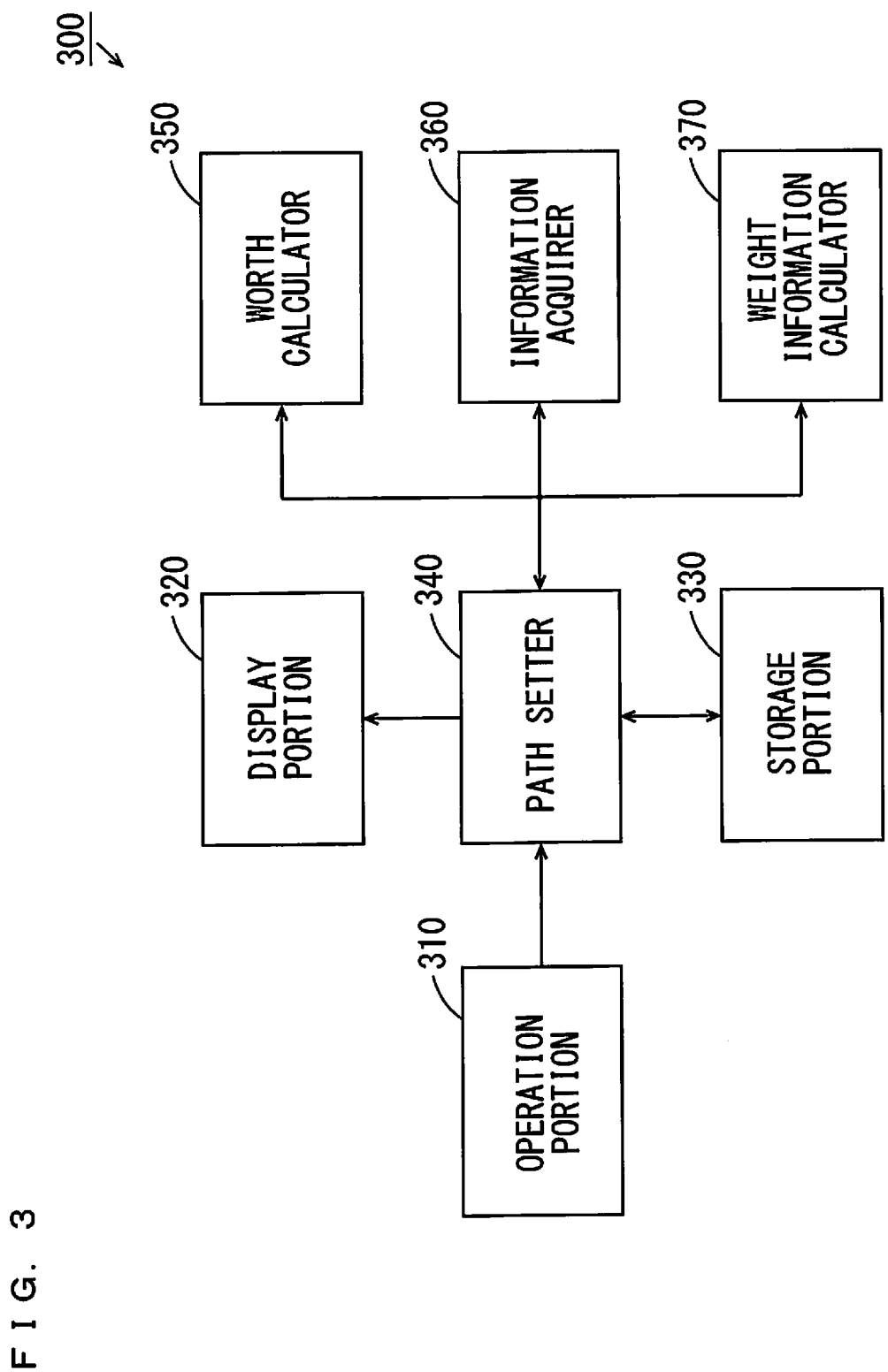
FIG. 3 is a block diagram showing one example of configurations of a simulation apparatus according to one embodiment of the present invention.

The weight information stored in the storage portion 130 of FIG. 1 is calculated by the simulation apparatus. FIG. 3 is a block diagram showing one example of configurations of the simulation apparatus according to one embodiment of the present invention. As shown in FIG. 3, the simulation apparatus 300 includes an operation portion 310, a display portion 320, a storage portion 330, a path setter 340, a worth calculator 350, an information acquirer 360 and a weight information calculator 370. The path setter 340, the worth calculator 350, the information acquirer 360 and the weight information calculator 370 are realized by a CPU and a computer program, for example.

The operation portion 310 includes a key board and a pointing device. The user can supply various instructions to the path setter 340 by operating the operation portion 310. The display portion 320 is a liquid crystal display panel or an organic EL (electroluminescence) display panel, for example.

The storage portion 330 is a hard disc, for example. Topographical data and moving device data are stored in the storage portion 330 in advance. Further, a path setting program, a worth calculation program, a destination positional information acquisition program, a topographical characteristics information acquisition program and a weight information calculation program are stored in the storage portion 330 in advance.

The topographical data is the data for displaying the plurality of paths and virtual topography including obstacles such as plants and rocks (hereinafter referred to as virtual topography) in the display portion 320. As the topographical data, the topographical data having the virtual topography similar to topography through which the moving device 200 actually travels is preferably used. The moving device data is the data for displaying a virtual moving device corresponding to the moving device 200 of FIG. 1 (hereinafter referred to as a virtual moving device) in the display portion 320.

The path setter 340 displays the virtual moving device and the virtual topography in the display portion 320 based on an operation of the operation portion 310 by the user. The moving device data is made of the data for displaying virtual sensor portion, actuator portion, moving mechanism portion, vehicle body and wheels respectively corresponding to the sensor portion 110, the actuator portion 220, the moving mechanism portion 230 and the vehicle body 240 of FIG. 1 and the wheels 250 of FIG. 2 in the display unit 320. The virtual moving device can travel on the plurality of paths in the virtual topography by driving the virtual actuator portion and moving mechanism portion.

Further, the path setter 340 sets combinations of the plurality of paths in the virtual topography through which the virtual moving device moves by performing a path setting process, described below. The path setter 340 stores the set combinations of the paths in the storage portion 330.

The worth calculator 350 moves the virtual moving device from an arbitrary point to an arbitrary destination in the virtual topography by performing a worth calculation process, described below, based on the topographical data and the moving device data. Thus, the worth calculator 350 acquires worth of each of the plurality of paths. Further, the worth calculator 350 calculates worth of the most suitable path to the arbitrary destination based on the acquired worth of each of the plurality of paths. The worth calculator 350 stores the calculated worth of the most suitable path regarding each of the plurality of destinations in the storage portion 330.

The information acquirer 360 acquires a plurality of destination positional information regarding a position of the arbitrary destination with respect to the arbitrary point in the virtual topography by performing a destination positional information acquisition process, described below, based on the topographical data and the moving device data. Further, the information acquirer 360 acquires a plurality of topographical characteristics information regarding characteristics of topography in surroundings of the arbitrary point in the virtual topography by performing a topographical characteristics information acquisition process, described below, based on the topographical data and the moving device data. The information acquirer 360 stores the plurality of acquired destination positional information and the plurality of acquired topographical characteristics information in the storage portion 330.

The weight information calculator 370 calculates weight information based on the worth of each of the plurality of paths to the destination, the plurality of destination positional information and the plurality of topographical characteristics information by performing a weight information calculation process, described below. The weight information is the information for calculating the worth correlation information that correlates with the worth of the path to the destination, and calculation of the weight information is performed by a canonical correlation analysis. The weight information calculator 370 stores the calculated weight information in the storage portion 330. The weight information stored in the storage portion 330 is stored in the storage portion 130 of the moving device 200.

(3) Operation of the Simulation Apparatus (a) Path Setting Process

Figure 4:
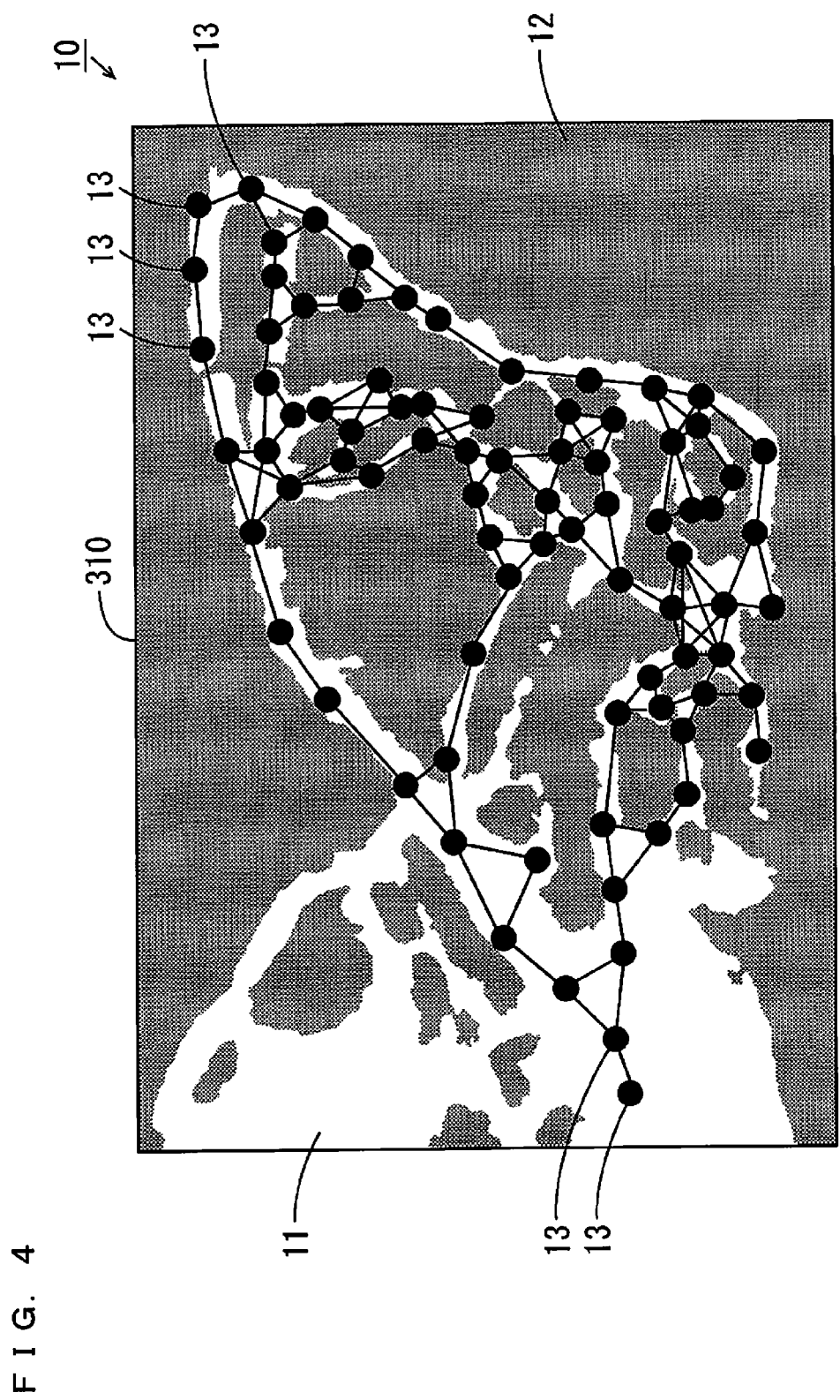
FIG. 4 is a diagram showing virtual topography used in a path setting process.

FIG. 4 is a diagram showing virtual topography used in the path setting process. As shown in FIG. 4, the virtual topography 10 includes a plurality of virtual paths 11 through which the virtual moving device can move and virtual obstacles 12 such as plants and rocks through which the virtual moving device cannot move. Hereinafter, the virtual paths 11 and the virtual obstacles 12 are referred to as the virtual paths 11 and the virtual obstacles 12, respectively. In FIG. 4, the virtual paths 11 are indicated by being filled in white, and portions in the diagram where the virtual obstacles 12 are located are indicated by a dotted pattern. In FIG. 4, differences in height in the virtual topography 10 are not shown.

Figure 5:
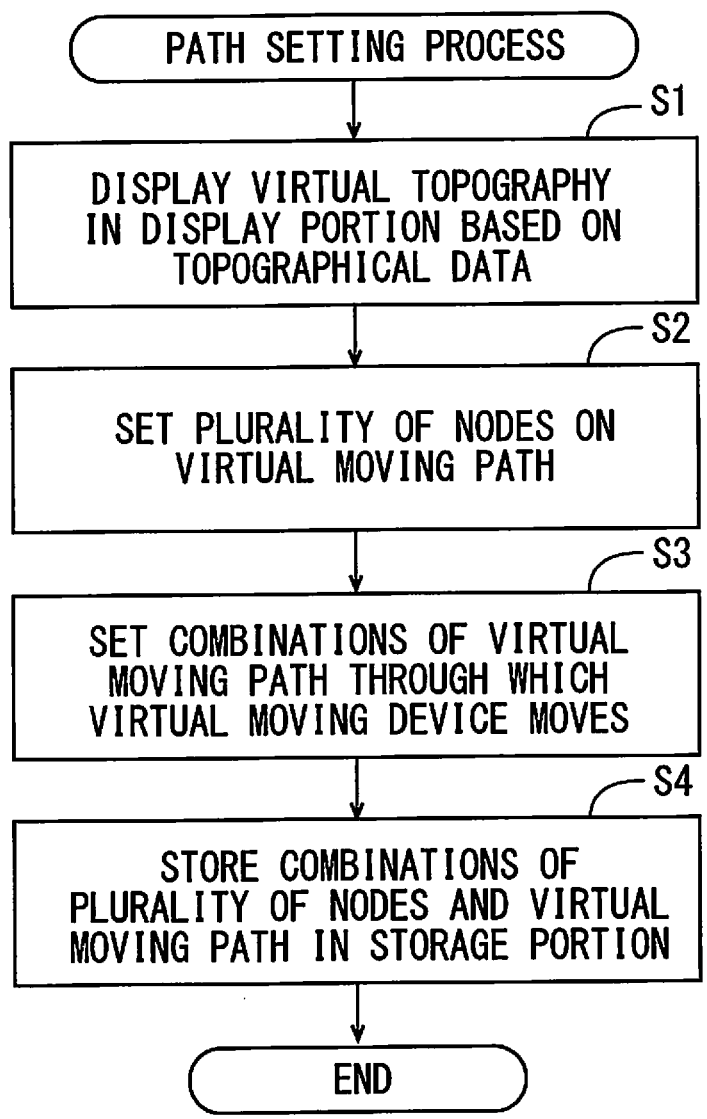
FIG. 5 is a flow chart showing the path setting process.

FIG. 5 is a flow chart showing the path setting process. The path setting process is performed by execution of a path setting program by the CPU of the simulation apparatus 300. In the path setting process, the user selects the topographical data stored in the storage portion 330 by operating the operation portion 310. The path setter 340 displays the virtual topography 10 in the display portion 320 based on the selected topographical data (step S1). Next, the path setter 340 sets a plurality of nodes 13 in a plurality of portions on the virtual path 11 (step S2). Letting the number of the set nodes 13 be N.

Subsequently, the path setter 340 sets combinations of the virtual paths 11 through which the virtual moving device moves by linking each of the set arbitrary nodes 13 to another (step S3). Thereafter, the path setter 340 stores the combinations of the plurality of set nodes and the virtual paths 11 in the storage portion 330 (step S4).

In the present example, 83 nodes 13 are set in the step S2. Here, the number of combinations of the virtual paths 11 from one node 13 to another node 13, which is a destination, is N×(N−1). Links among the nodes 13 are voluntarily set, so that combinations of an arbitrary number of virtual paths 11 can be set.

In the present example, 9378 types of combinations of the virtual paths 11 are set in the step S3. After the path setting process, each of the worth calculation process, the destination positional information acquisition process and the topographical characteristics information acquisition process is continued.

(b) Worth Calculation Process

Figure 6:
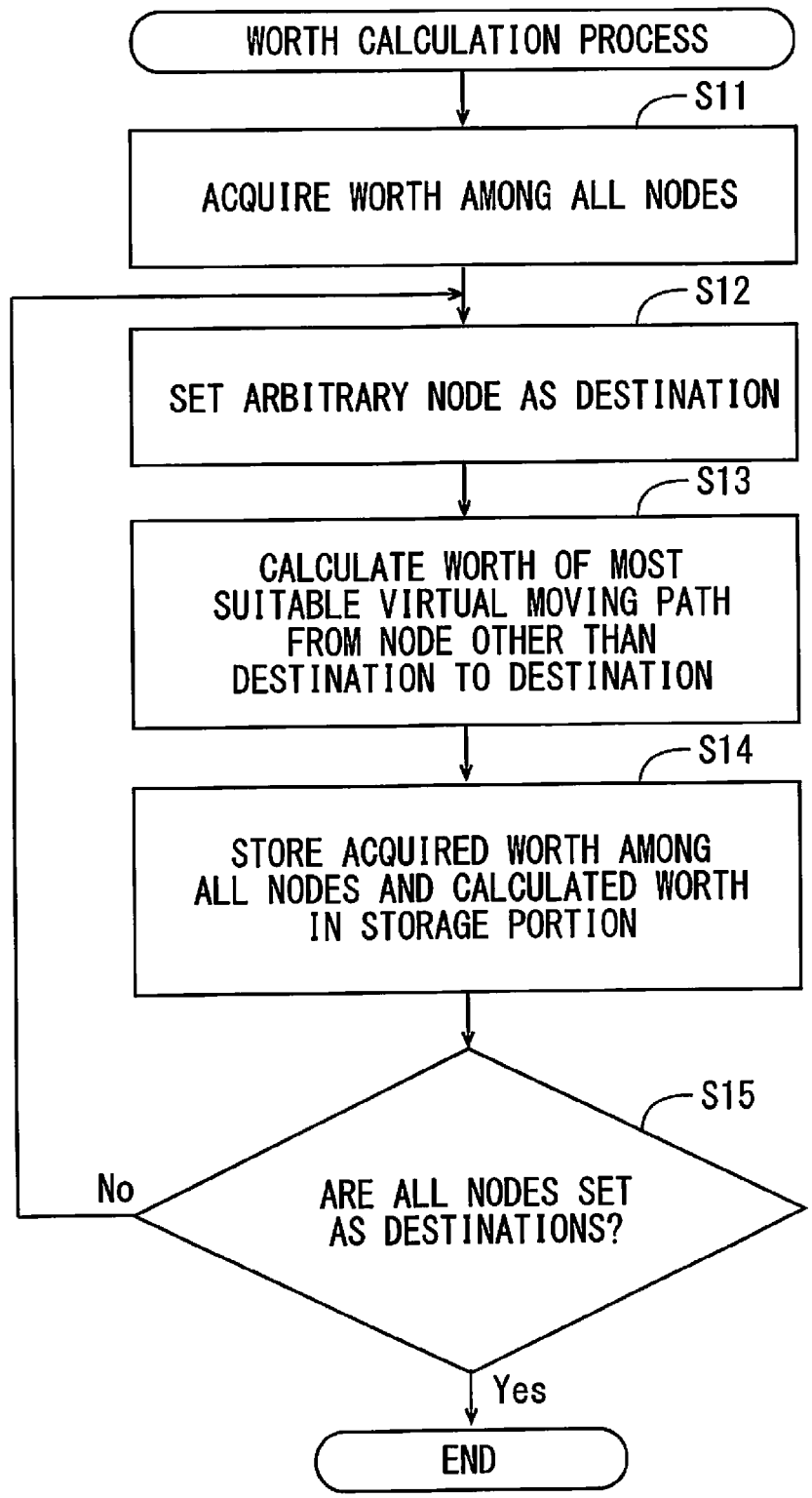
FIG. 6 is a flow chart showing a worth calculation process by a worth calculator.

The worth calculator 350 performs the worth calculation process after the path setting process is ended. FIG. 6 is a flow chart showing the worth calculation process by the worth calculator 350. The worth calculation process is performed by execution of a worth calculation program by the CPU of the simulation apparatus 300.

The worth calculator 350 acquires the worth among all of the nodes 13 by allowing the virtual moving device to travel among all of the nodes 13 (step S11). In the present example, worth between each two nodes 13 is a moving time period of the virtual moving device when the virtual moving device travels between the two nodes 13. The worth between each two nodes 13 may be a ratio of fuel consumption of the virtual moving device when the virtual moving device moves among the two nodes 13.

Next, the worth calculator 350 sets an arbitrary node 13 as a destination (step S12). Subsequently, the worth calculator 350 calculates the worth of the most suitable virtual path 11 from a node 13 other than the destination to the destination (step S13). The calculation of worth is performed by dynamic programming. Thereafter, the worth calculator 350 stores the acquired worth among all of the nodes 13 and the calculated worth in the storage portion 330 (step S14).

Next, the worth calculator 350 determines whether all of the nodes 13 are set as destinations (step S15). In the step S15, when all of the nodes 13 are not set as the destinations, the worth calculator 350 returns to the process of the step S12. Thus, the process from the steps S12 to S15 is repeated. On the one hand, in the step S15, when all of the nodes 13 are set as the destinations, the worth calculator 350 ends the worth calculation process.

In the step S11, the worth among the nodes 13 is acquired based on a moving velocity of the virtual moving device. For example, when unevenness between nodes 13 is large, the moving velocity of the virtual moving device decreases. Therefore, the worth between the nodes 13 is low.

Further, in the acquisition of the worth between the nodes 13, an orientation of the virtual moving device is considered. In a case in which inclination from one node 13 to another node 13 is upward, the moving velocity of the virtual moving device decreases when the virtual moving device moves from the one node 13 to the other node 13. In contrast, the moving velocity of the virtual moving device increases when the virtual moving device moves from the other node 13 to the one node 13. Therefore, the worth between the nodes 13 decreases when the virtual moving device moves from the one node 13 to the other node 13, and the worth between the nodes 13 increases when the virtual moving device moves from the other node 13 to the one node 13.

(c) Destination Positional Information Acquisition Process

Figure 7:
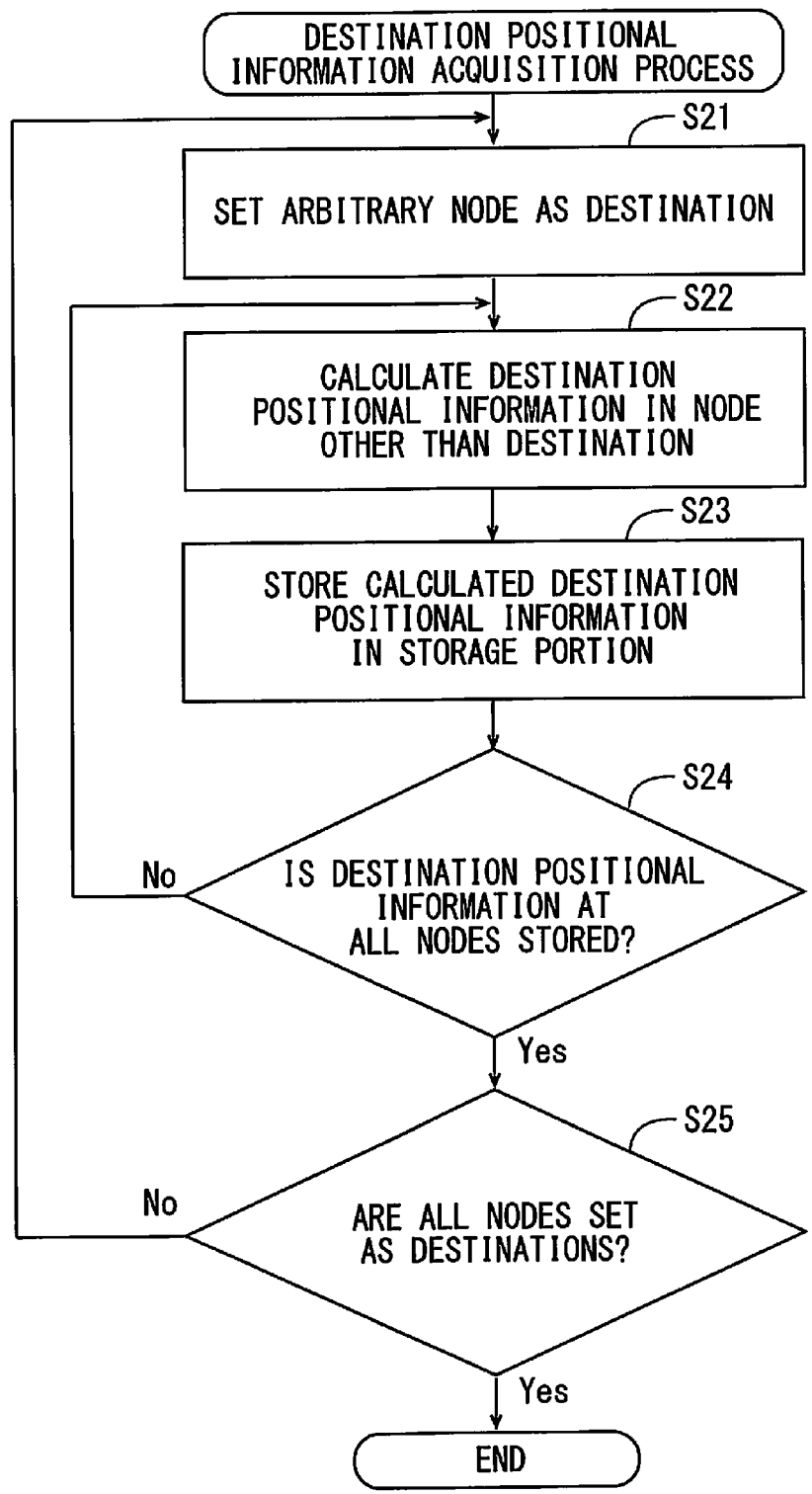
FIG. 7 is a flow chart showing a destination positional information acquisition process by an information acquirer.

The information acquirer 360 performs a destination positional information acquisition process after the path setting process is ended. FIG. 7 is a flow chart showing the destination positional information acquisition process by the information acquirer 360. The destination positional information acquisition process is performed by execution of a destination positional information acquisition program by the CPU of the simulation apparatus 300.

The information acquirer 360 sets an arbitrary node 13 as a destination (step S21). Next, the information acquirer 360 calculates the destination positional information at a node 13 other than the destination (step S22). The destination positional information is calculated based on the positioning information by the position orientation sensor of the sensor portion of the virtual moving device. The destination positional information is made of 3 components (an 'r' component, an 'h' component and a 'θ' component). That is, the destination positional information has 3 dimensions.

Subsequently, the information acquirer 360 stores the calculated destination positional information in the storage portion 330 (step S23). Thereafter, the information acquirer 360 determines whether the destination positional information at all of the nodes 13 other than the destination are stored in the storage portion 330 (step S24). In the step S24, when the destination positional information at all of the nodes 13 other than the destination are not stored in the storage portion 330, the information acquirer 360 returns to the process of the step S22. Thus, the process from the steps S22 to S24 is repeated.

On the one hand, in the step S24, when the destination positional information at all of the nodes 13 other than the destination is stored in the storage portion 330, the information acquirer 360 determines whether all of the nodes 13 are set as the destinations (step S25). In the step S25, when all of the nodes 13 are not set as the destinations, the information acquirer 360 returns to the process of the step S21. Thus, the process from the step S21 to S25 is repeated. On the one hand, in the step S25, when all of the nodes 13 are set as the destinations, the information acquirer 360 ends the destination positional information acquisition process.

Figure 8A:
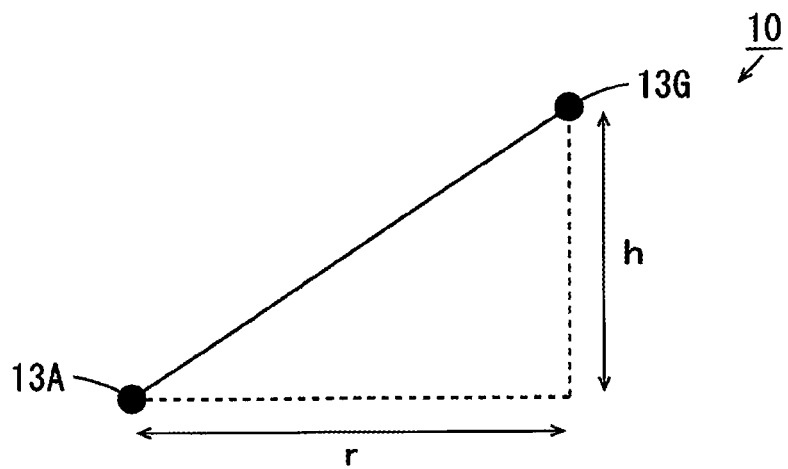
FIG. 8 is a diagram for explaining an 'r' component, an 'h' component and a '0' component of destination positional information.
Figure 8B:
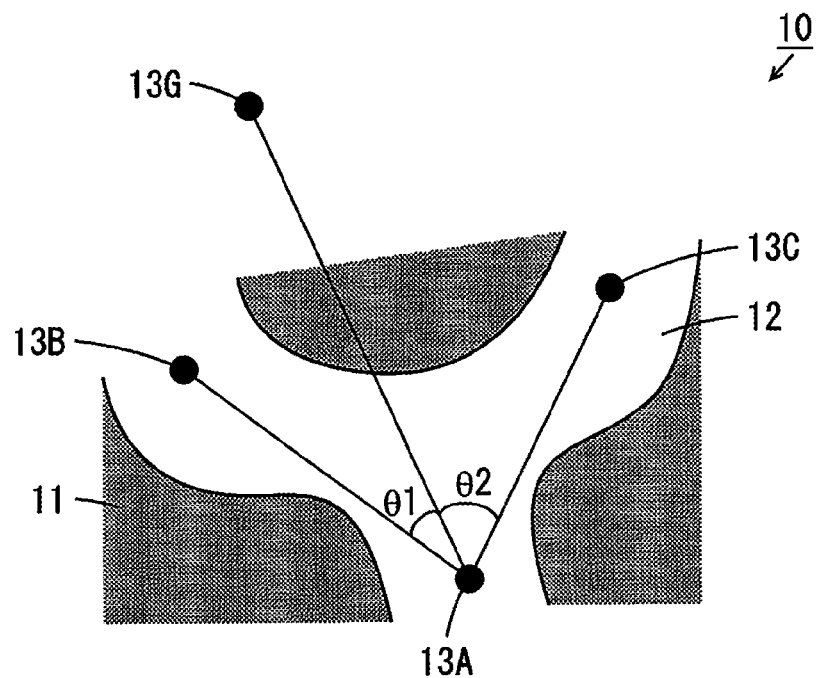

FIG. 8 is a diagram for explaining the r component, the h component and the θ component of the destination positional information. FIG. 8(*a*) shows a side view of part of the virtual topography 10, and FIG. 8(*b*) shows a plan view of part of the virtual topography 10. In the FIGS. 8(*a*), 8(*b*), a node 13G is set as a destination. Attention is paid to a node 13A as a node 13 other than the node 13G.

In this case, as shown in FIG. 8(*a*), a distance in a horizontal direction to the node 13G with respect to the node 13A is the r component of the destination positional information at the node 13A. Further, a distance in a vertical direction to the node 13G with respect to the node 13A is the h component of the destination positional information at the node 13A.

Further, an angle formed by a line extending from the node 13A towards another node 13 other than the destination and a line extending from the node 13A towards the node 13G is the θ component of the destination positional information at the node 13A. In the example of FIG. 8(*b*), nodes 13B, 13C are set as nodes 13 adjacent to the node 13A. An angle formed by a line extending from the node 13A towards the node 13B and a line extending from the node 13A towards the node 13G is θ1, and an angle formed by a line extending from the node 13A towards the node 13C and the line extending from the node 13A toward the node 13G is θ2.

Therefore, when the virtual moving device moves from the node 13A to the node 13B, the angle θ1 is the θ component of the destination positional information at the node 13A. On the one hand, when the virtual moving device moves from the node 13A to the node 13C, the angle θ2 is the θ component of the destination positional information at the node 13A. In this manner, the θ components of the destination positional information of each node 13 are different from one another depending on the path of the virtual moving device.

(d) Topographical Characteristics Information Acquisition Process

Figure 9:
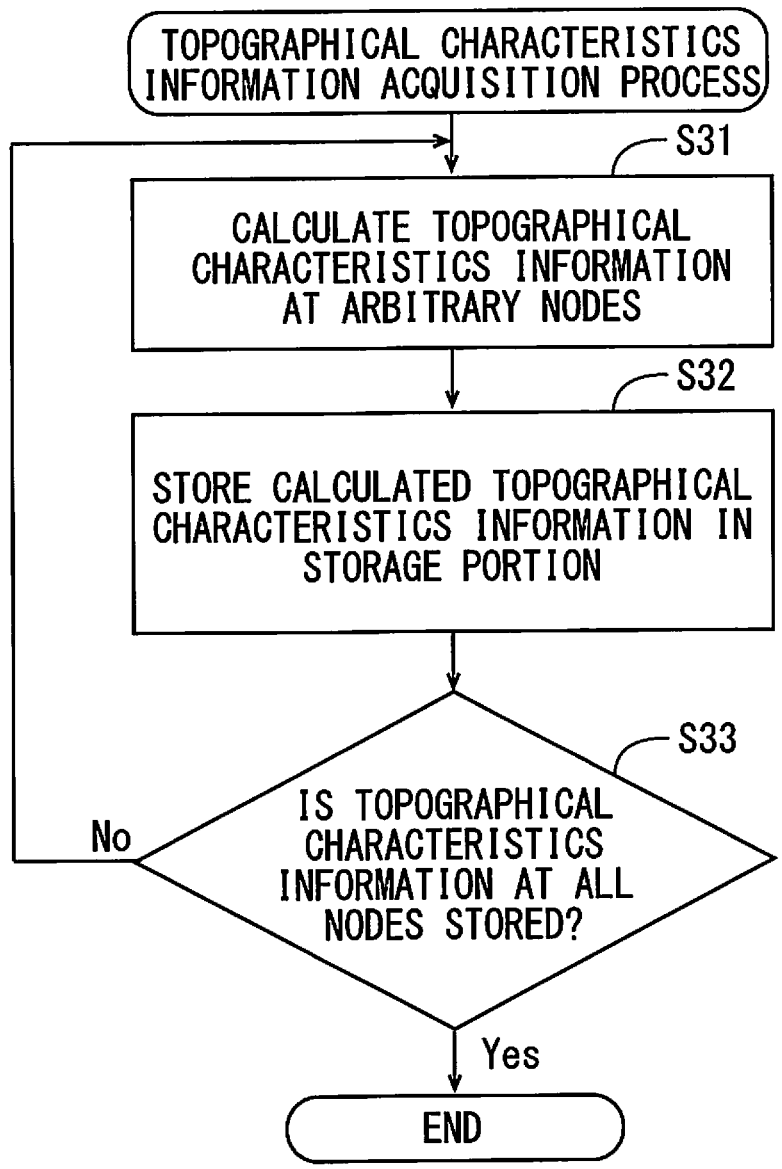
FIG. 9 is a flow chart showing a topographical characteristics information acquisition process by the information acquirer.

The information acquirer 360 performs the topographical characteristics information acquisition process after the path setting process is ended. FIG. 9 is a flow chart showing the topographical characteristics information acquisition process by the information acquirer 360. The topographical characteristics information acquisition process is performed by execution of a topographical characteristics information acquisition program by the CPU of the simulation apparatus 300.

The information acquirer 360 calculates the topographical characteristics information at an arbitrary node 13 (step S31). The topographical characteristics information is made of 16 components (f1 to f16 components, described below). That is, the destination positional information has 16 dimensions.

Next, the information acquirer 360 stores the calculated topographical information in the storage portion 330 (step S32). Subsequently, the information acquirer 360 determines whether the topographical characteristics information at all of the nodes 13 is stored in the storage portion 330 (step S33). In the step S33, when the topographical information at all of the nodes 13 is not stored in the storage portion 330, the information acquirer 360 returns to the process of the step S31. Thus, the process from the steps S31 to S33 is repeated. On the one hand, in the step S33, when the topographical characteristics information at all of the nodes 13 is stored in the storage portion 330, the information acquirer 360 ends the topographical characteristics information acquisition process.

FIG. 10 is a diagram for explaining the f1 to f16 components of the topographical characteristics information. FIG. 10(*a*) shows a plan view of part of the virtual topography 10, and FIG. 10(*b*) shows a side view of part of the virtual topography 10. In FIGS. 10(*a*), 10(*b*), attention is paid to the node 13A as an arbitrary node 13. The virtual moving device 1 is arranged at the node 13A while having an orientation of facing in an advancing direction.

As shown in FIGS. 10(*a*), 10(*b*), laser light beams are emitted from the environment recognition sensor of the sensor portion of the virtual moving device 1 in a range of 180° of a front surface of the virtual moving device 1. Further, laser light beams reflected by objects in surroundings of the virtual moving device 1 are detected by the environment recognition sensor. Here, the objects include obstacles such as ground surfaces, plants and rocks.

Out of the detected positions of the plurality of objects that have reflected the laser light beams, a position closest to the virtual moving device 1 is P1, and a position farthest from the virtual moving device 1 is P2. Laser light beams L1 to L16 respectively reflected by objects at 16 positions that equally divide a distance between the positions P1, P2 into 15 are extracted. Distances to the objects measured by the laser light beams L1 to L16 are d1 to d16, respectively.

Next, a plurality of laser light beams respectively reflected by a plurality of objects near the distance d1 are detected. An average worth of distances to the plurality of objects measured by these plurality of laser light beams is the f1 component of the topographical characteristics information. A plurality of laser light beams respectively reflected by a plurality of objects near the distance d2 are detected. An average worth of distances to the plurality of objects measured by these plurality of laser light beams is the f2 component of the topographical characteristics information.

A plurality of laser light beams respectively reflected by a plurality of objects near the distance d3 are detected. An average worth of distances to the plurality of objects measured by these plurality of laser light beams is the f3 component of the topographical characteristics information. Similarly, a plurality of laser light beams respectively reflected by a plurality of objects near the distances d4 to d16 are detected. Average numerical values of distances to the plurality of objects measured by the plurality of laser light beams corresponding to the distances d4 to d16 are the f4 to f16 components of the topographical characteristics information, respectively.

From the above process, in the step S31, the topographical characteristics information having 16 components at the node 13A of when the virtual moving device 1 has one orientation is calculated. That is, the number of dimensions of components of the topographical characteristics information is decreased from the large number of 64,000 (in the present example) to 16.

In the present example, the number of orientations of the virtual moving device 1 that moves through the virtual path 11 is limited to 2, so that 2 topographical characteristics information are calculated according to orientations of the virtual moving device 1 at each node 13. Therefore, when the virtual moving device 1 has another orientation (an orientation facing in an opposite direction to the advancing direction of FIGS. 10(*a*), 10(*b*)), the above-mentioned process is repeated. Thus, in the step S31, the topographical characteristics information at the node 13A of when the virtual moving device 1 has another orientation is calculated.

(e) Weight Information Calculation Process

Figure 11:
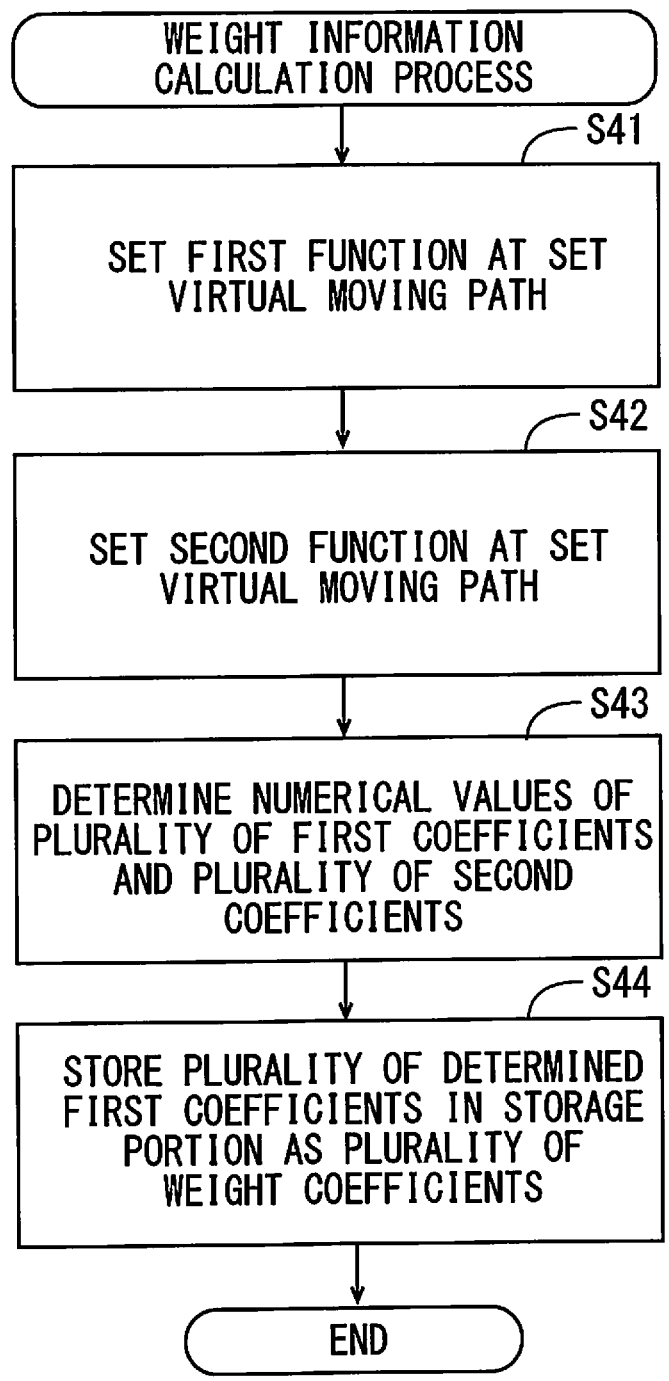
FIG. 11 is a flow chart showing a weight information calculation process by a weight information calculator.

The weight information calculator 370 performs the weight information calculation process after the worth calculation process, the destination positional information acquisition process and the topographical characteristics information acquisition process are ended. FIG. 11 is a flow chart showing the weight information calculation process by the weight information calculator 370. The weight information calculation process is performed by execution of a weight information calculation program by the CPU of the simulation apparatus 300.

The weight information calculator 370 sets a first function in the plurality of virtual paths 11 set by the path setter 340 (step S41). The first function includes a plurality of first variables and a plurality of first coefficients. The plurality of first variables include a plurality of destination positional information and a plurality of topographical characteristics information. The plurality of first coefficients respectively correspond to the plurality of first variables.

Here, the first function x is given by a following formula (1).

[Formula 1]

$$x = aX = [a1\ a2\ a3\ \ldots\ a19] \begin{bmatrix} r^{(1)} & r^{(2)} & \ldots & r^{(n)} \\ h^{(1)} & h^{(2)} & \ldots & h^{(n)} \\ \theta^{(1)} & \theta^{(2)} & \ldots & \theta^{(n)} \\ f1^{(1)} & f1^{(2)} & \ldots & f1^{(n)} \\ \vdots & \vdots & \ldots & \vdots \\ \vdots & \vdots & \ldots & \vdots \\ \vdots & \vdots & \ldots & \vdots \\ f16^{(1)} & f16^{(2)} & \ldots & f16^{(n)} \end{bmatrix} \quad (1)$$

As shown in the formula (1), the first function x is multiplication of a first coefficient matrix 'a' and a first variable matrix X. The first coefficient matrix 'a' is a data matrix of 1 row×p column. The first coefficient matrix 'a' includes p first coefficients. p is an integer of not less than 2. In the present embodiment, the first coefficient matrix 'a' includes 19 first coefficients a1, a2, a3, . . . , a19. The first variable matrix X is a data matrix of p row×n column. p is an integer indicating the number of the first coefficient, and n is an integer indicating the number of combinations of the virtual paths 11. In the present example, p is 19, and n is 9378.

Each column of the first variable matrix X includes p first variables. In the present example, each column includes p first variables $r^{(i)}, h^{(i)}, \theta^{(i)}, f1^{(i)}$ to $f16^{(i)}$. Here, i is an integer from 1 to n. In the present embodiment, the r component, the h component and the θ component of the destination positional information corresponding to an 'i'th virtual path 11, and the f1 to f16 components of the topographical characteristics information are the equivalent of p first variables $r^{(i)}, h^{(i)}, \theta^{(i)}, f1^{(i)}$ to $f16^{(i)}$.

In this manner, the plurality of first coefficients a1, a2, a3, a19 of the first coefficient matrix 'a' correspond to the plurality of first variables $r^{(i)}, h^{(i)}, \theta^{(i)}, f1^{(i)}$ to $f16^{(i)}$ of each column of the first variable matrix X, respectively.

Further, the weight information calculator 370 sets a second function in the plurality of virtual paths 11 set by the path setter 340 (step S42). The second function includes one or a plurality of second variables and one or a plurality of second coefficients. The one or plurality of second variables include worth of the most suitable virtual path 11 to the destination. The one or plurality of second coefficients correspond to the one or plurality of second variables, respectively.

Here, the second function y is given by a following formula (2).

[Formula 2]

$$y = bY = b[v^{(1)} v^{(2)} \ldots v^{(n)}] \quad (2)$$

As shown in the formula (2), the second function y is multiplication of a second coefficient matrix b and a second variable matrix Y. The second coefficient matrix b is a data matrix of 1 row×q column. In the present example, q is 1. Therefore, the second coefficient matrix b only includes 1 second coefficient, and the second coefficient matrix b is equal to the second coefficient b. The second variable matrix Y is a data matrix of q row×n column. As described above, n is an integer indicating the number of combinations of the virtual paths 11. In the present example, q is 1, and n is 9378.

Each row (1 row in the present example) of the second variable matrix Y includes n second variables. In the present example, each row includes n second variables $v^{(1)}, v^{(2)}, v^{(3)}, \ldots, v^{(n)}$. In the present embodiment, worth v corresponding to an 'i'th virtual path 11 is the equivalent of the second variable $v^{(i)}$. Here, i is an integer from 1 to n.

Next, the weight information calculator 370 determines numerical values of the plurality of first coefficients and numerical values of the one or plurality of second coefficients such that a correlation between the first function x and the second function y is maximum (step S43).

In the step S43, numerical values of the first coefficients a1, a2, a3, a19 of the plurality of first coefficient matrices 'a' and numerical values of the second coefficient matrix b (a numerical value of the second coefficient b) are determined by a following step. First, covariance matrices $S_{XX}, S_{YY}, S_{YX}$ given by following formulas (3), (4) and (5) are calculated. A superscript "T" indicates a transposed matrix.

[Formula 3]

$$S_{XX} = \frac{1}{n} X\sigma X\sigma^T \quad (3)$$

[Formula 4]

$$S_{YY} = \frac{1}{n} Y\sigma Y\sigma^T \quad (4)$$

[Formula 5]

$$S_{YX} = \frac{1}{n} Y\sigma X\sigma^T \quad (5)$$

Here, Xσ is an average deviation matrix acquired by subtraction of an average worth of a component in a row direction of the first variable matrix X from each component in a row direction of the first variable matrix X. Yσ is an average deviation matrix acquired by subtraction of an average worth of a component in a row direction of the second variable matrix Y from each component in a row direction of the second variable matrix Y. Next, a function r (a, b) given by a following formula (6) is calculated.

[Formula 6]

$$r(a, b) = \frac{bS_{YX}a^T}{\sqrt{aS_{XX}a^T}\sqrt{bS_{YY}b^T}} \quad (6)$$

Here, the function r (a, b) is a correlation function of a linear combination of the first coefficient matrix 'a', the second coefficient matrix b, the first variable matrix X and the second variable matrix Y. The first coefficient matrix 'a' and the second coefficient matrix b that maximizes the function r (a, b) are first canonical correlation vectors and respectively indicated by A and B.

The first and second functions $x_m$, $y_m$ having a maximum correlation is found by the above-mentioned method as shown in following formulas (7) and (8).

[Formula 7]

$$x_m = AX_m = [A1\ A2\ A3\ \ldots\ A19] \begin{bmatrix} r \\ h \\ \theta \\ f1 \\ \vdots \\ \vdots \\ f16 \end{bmatrix} \quad (7)$$

[Formula 8]

$$y_m = BY_m = Bv \quad (8)$$

The first canonical correlation vector A of the above formula (7) includes p first weight coefficients A1, A2, A3, . . . , A19. The first variable matrix $X_m$ of the above formula includes p first variables r, h, θ, f1 to f16. The first variables r, h, θ are the equivalent of the r component, the h component and the θ component of the destination positional information, and the first variables f1, to f16 are equivalent of the f1 to f16 components of the topographical characteristics information.

In the above formula (8), a first canonical correlation vector B includes q (1 in the present example) second weight variable B. A first variable matrix $Y_m$ of the above formula includes q (1 in the present example) second variable v. The second variable v is the equivalent of worth v.

A correlation between the first function $x_m$ of the above formula (7) and the second function $y_m$ of the above formula (8) is maximized. Therefore, a worth of the first function $x_m$ of when numerical values are substituted into the first variables r, h, θ, f1, . . . , f16 of the formula (7) indicates how high the worth v is. In this case, a numerical value of the first function $x_m$ is the equivalent of the worth correlation information to the destination.

The path selector 180 of FIG. 1 can select a path having the highest worth by selecting a path at which a numerical value of the first function x is maximum based on the formula (7).

The weight information calculator 370 stores the determined numerical values of the plurality of first coefficients in the storage portion 330 as the plurality of above-mentioned weight coefficients A1 to A19 (step S44). The determined numerical values of the plurality of first coefficients (the plurality of weight coefficients A1 to A19) are weight information. Thus, the topographical characteristics information acquisition process is ended.

In this manner, the plurality of destination positional information, the plurality of topographical characteristics information and the worth of each of the plurality of paths to the destination are acquired using the virtual topography 10 including the plurality of paths. Thus, a plurality of destination positional information, a plurality of topographical characteristics information and worth of each of a plurality of paths to the destination, of arbitrary topography can be easily acquired, and a weight coefficient of the arbitrary topography can be easily calculated.

(4) Operation of the Navigation Apparatus

Figure 12:
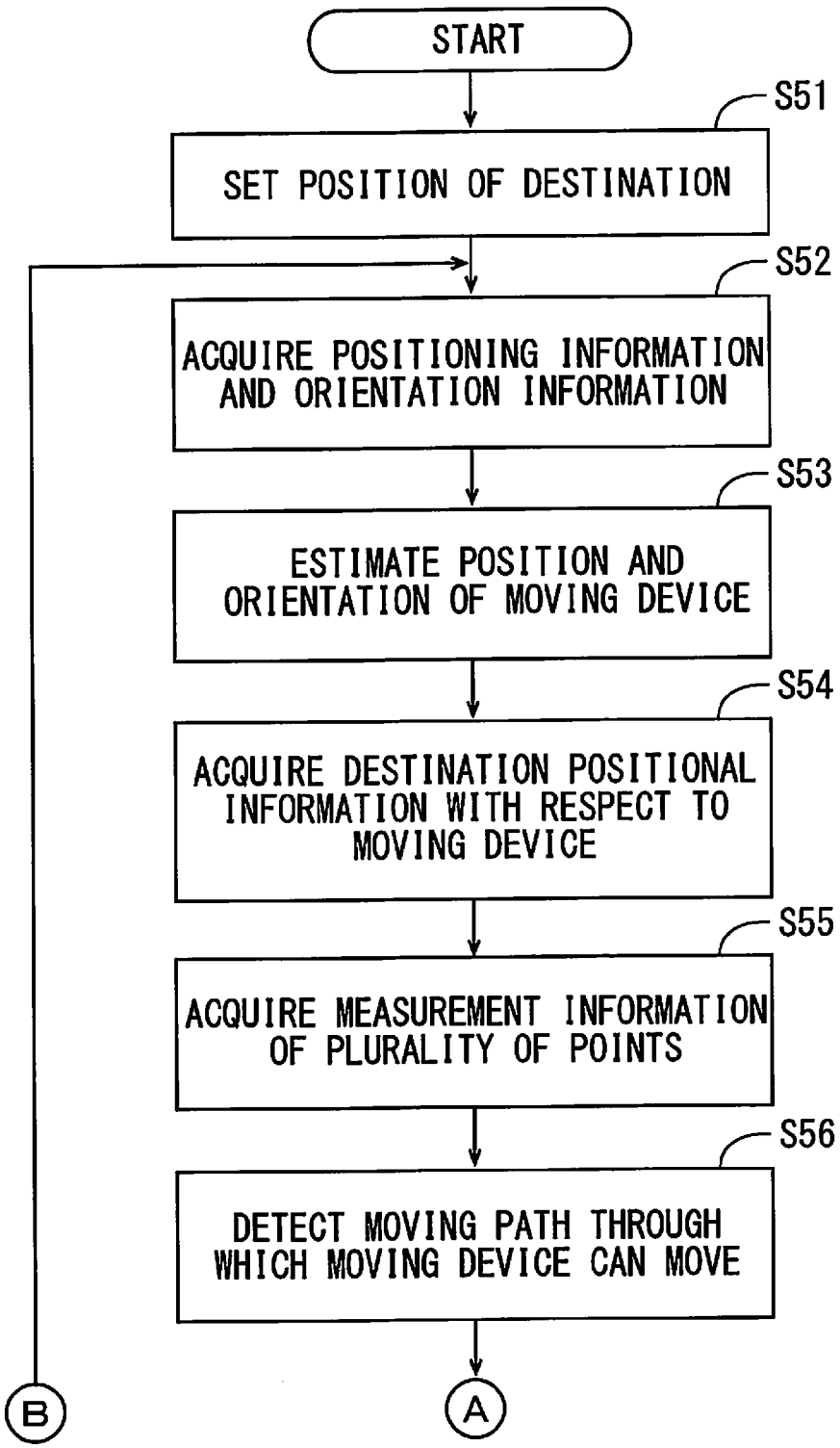
FIG. 12 is a flow chart showing a navigation process by a navigation apparatus.

FIGS. 12 and 13 are flow charts showing a navigation process by the navigation apparatus 100. The navigation process is performed by execution of a navigation program by the CPU of the navigation apparatus 100. The moving device 200 is arranged in a farm or a disaster site where the moving device 200 is actually used. The weight information calculated in the step S44 of the weight information calculation process is stored in the storage portion 130.

The user operates the operation portion 120 to designate a position of a destination in advance. The destination positional information acquirer 140 sets the position of the designated destination (step S51). The controller 210 of the moving device 200 drives the moving mechanism portion 230 by controlling the actuator portion 220. Thus, movement of the moving device 200 is started.

Next, the destination positional information acquirer 140 acquires positioning information and orientation information from the position orientation sensor 111 (step S52). The destination positional information acquirer 140 estimates a position and an orientation of the moving device 200 based on the acquired positioning information and the orientation information (step S53). Further, the destination positional information acquirer 140 acquires the destination positional information (the r component, the h component and the θ component) regarding the position of the destination with respect to the moving device 200 based on the position of the moving device 200 and the position of the destination (step S54).

The path detector 150 acquires measurement information of a plurality of points from the environment recognition sensor 112 (step S55). The path detector 150 detects the path through which the moving device 200 can move based on the acquired measurement information of the plurality of points (step S56).

The topographical characteristics information acquirer 160 extracts the topographical characteristics information (the f1 to f16 components) from the measurement information of the plurality of points by the environment recognition sensor 112 (step S57). The three components (the r component, the h component and the θ component) of the destination positional information acquired in the step S54 and the θ components (the f1 to f16 components) of the topographical characteristics information extracted in the step S57 are the first variable matrix $X_m$ of the formula (7).

Figure 10A:
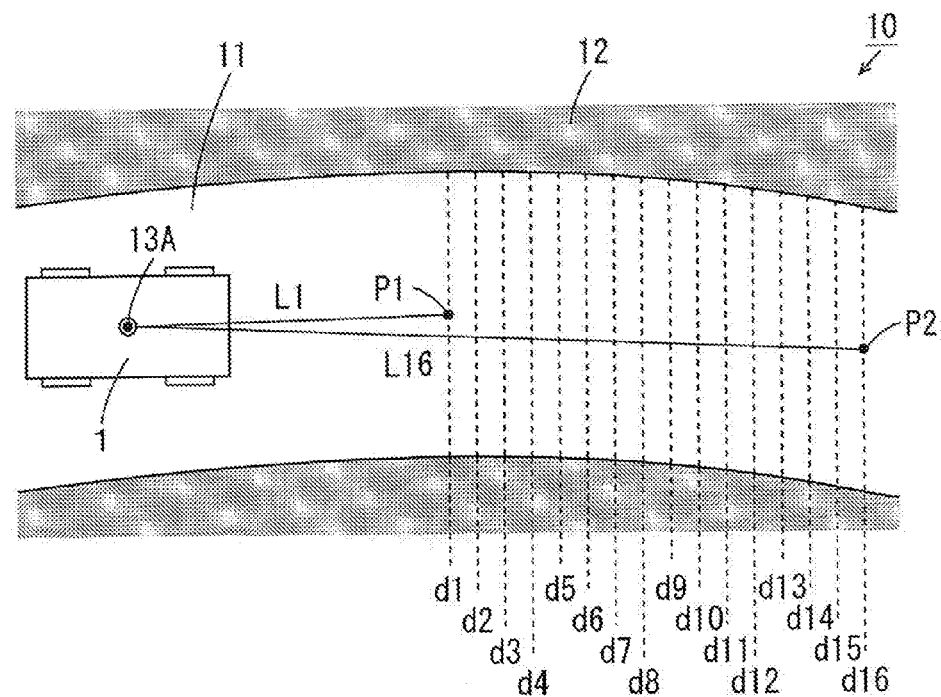
FIG. 10 is a diagram for explaining f1 to f16 components of the topographical characteristics information.
Figure 10B:
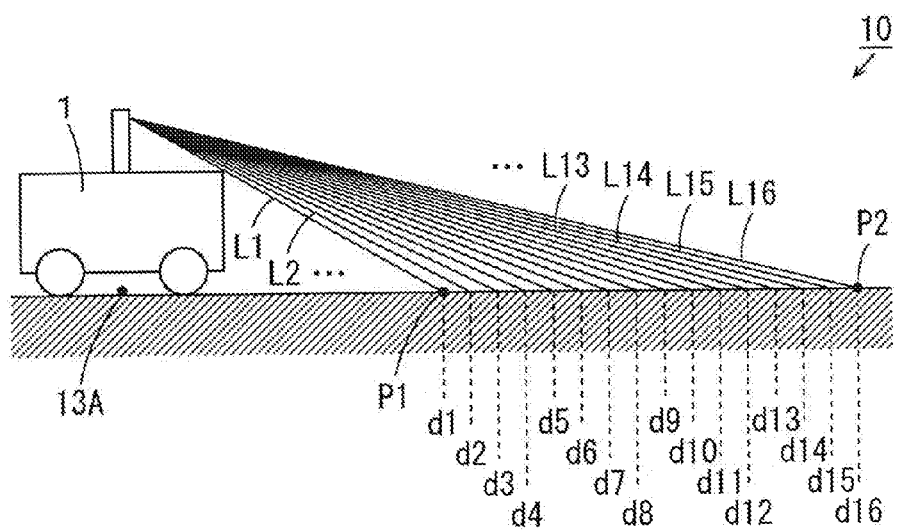

Steps of extraction of the topographical characteristics information are similar to steps of extraction of the f1 to f16 components of 16 topographical characteristics information from the topographical characteristics information having 64,000 components in FIGS. 10(a), 10(b). Thus, in the step S58, the worth estimator 170 can quickly estimate the worth of the one or plurality of paths to the destination without largely reducing reliability.

The worth estimator 170 estimates worth of the one or plurality of paths to the destination (step S58). The estimation of the worth of the paths to the destination is performed by calculation of the worth correlation information that correlates with the worth regarding the one or plurality of paths to the destination from the destination positional information and the topographical characteristics information based on the weight information stored in the storage portion 130. Here, the weight information stored in the storage portion 130 is the first canonical correlation vector A (the plurality of weight coefficients A1 to A19) of the formula (7), and the worth correlation information to the destination is the first function $x_m$ of the formula (7). Therefore, a numerical value of the first function $x_m$ is calculated from the first canonical correlation vector A and the first variable matrix $X_m$ regarding the one or plurality of paths based on the formula (7), whereby worth v of the paths to the destination is estimated.

The path selector 180 selects the path having the highest worth of the worth estimated by the worth estimator 170 (step S59). The controller 210 moves through the path designated by the path selector 180. Here, the destination positional information acquirer 140 determines whether a position of the moving device 200 is a position of the destination (step S60).

In the step S60, when the position of the moving device 200 is not the position of the destination, the CPU returns to the process of the step S52. Thus, the process from the step S52 to S60 is repeated. On the one hand, in the step S60, when the position of the moving device 200 is the position of the destination, the CPU ends the navigation process.

(5) Effects

In the navigation apparatus 100 according to the present embodiment, the one or plurality of paths are detected by the path detector 150. The destination positional information (the r component, the h component and the θ component) is acquired by the destination positional information acquirer 140. The topographical characteristics information (the f1 to f16 components) is acquired by the topographical characteristics information acquirer 160. The weight information (the first canonical correlation vector A including the plurality of weight coefficients A1 to A19) is stored in the storage portion 130 in advance.

The worth correlation information (a numerical value of the first function $x_m$) regarding the one or plurality of detected paths to the destination is calculated by the worth estimator 170 from the acquired destination positional information (the r component, the h component and the θ component), the topographical characteristics information (the f1 to f16 components) based on the stored weight information and the formula (7). Further, the worth v of the one or plurality of paths to the destination is estimated by the worth estimator 170 based on the calculated worth correlation information.

Thus, even when there is no prior information of the path, the worth of the one or plurality of paths to the destination can be estimated. The moving device 200 can reach the destination at a high probability by moving through the path estimated to have high worth. As a result, even when there is no prior information of the path, the navigation apparatus 100 can efficiently move the moving device 200 to the destination.

Further, in the simulation apparatus 300 according to the present embodiment, the worth of the most suitable path regarding each of the plurality of destinations in the virtual topography 10 is calculated by the worth calculator 350. The plurality of destination positional information and the plurality of topographical characteristics information in the virtual topography 10 are acquired by the information acquirer 360. The weight information is calculated by the weight information calculator 370 based on the acquired worth of each of the plurality of the paths to the destination and the plurality of acquired destination positional information and the plurality of acquired topographical characteristics information.

Thus, even when there is no prior information of the path, the weight information used for estimation of worth of the path to the destination in the navigation apparatus 100 capable of efficiently moving the moving device 200 to the destination can be generated.

(6) Other Embodiments (a) While the worth of the path to the destination is the moving time period or the energy consumption in the above-mentioned embodiment, the invention is not limited to this. The worth of the path to the destination may be a moving time period and energy consumption. In this case, the shorter the moving time period is and the smaller an amount of the energy consumption is when the moving device 200 moves through the path, the higher the worth of the path to the destination is. Therefore, the navigation apparatus 100 can move the moving device 200 to the destination in a short period time and with a small amount of energy consumption by selecting the path having high worth.

In this manner, when the worth of the path to the destination includes a plurality of elements, a second function y set by the weight information calculator 370 of the simulation apparatus 300 in the weight information calculation process is given by a following formula (9) instead of the formula (2). Further, a second function $y_m$ having a maximum correlation with a first function $x_m$ of the formula (7) is given by a following formula (10) instead of the formula (8). Here, v1, v2 are worth of the most suitable virtual paths to the destination respectively corresponding to the moving time period and the energy consumption.

[Formula 9]
$$y = bY = [b1\ b2]\begin{bmatrix} v1^{(1)} & v1^{(2)} & \ldots & v1^{(n)} \\ v2^{(1)} & v2^{(2)} & \ldots & v2^{(n)} \end{bmatrix} \quad (9)$$

[Formula 10]
$$y_m = BY_m = [B1\ B2]\begin{bmatrix} v1 \\ v2 \end{bmatrix} \quad (10)$$

(b) While the path selector 180 selects the path having the highest worth of the worth estimated by the worth estimator 170 in the above-mentioned embodiment, the invention is not limited to this. When the selected path is a dead end, the moving device 200 returns to the latest branch point of the path. Here, the path selector 180 may select a path having worth other than the highest worth (second highest worth, for example) of the worth estimated by the worth estimator 170.

(c) In the above-mentioned embodiment, the number of dimensions of components of the topographical characteristics information is decreased from the large number to 16. However, the invention is not limited to this. The number of dimensions of components of the topographical characteristics information may be decreased from the large number to not more than 15. In this case, the worth estimator 170 can more quickly estimate the worth of the one or plurality of paths to the destination. Alternatively, the number of dimensions of the components of the topographical characteristics information may be decreased from the large number to not less than 17 components. In this case, the worth estimator 170 can more accurately estimate the worth of the one or plurality of paths to the destination.

(d) While the moving device 200 is a four-wheeled vehicle in the above-mentioned embodiment, the invention is not limited to this. The moving device 200 may be another moving device such as a two-wheeled vehicle, a three-wheeled vehicle, a vessel or a walking robot.

(7) Correspondences Between Constituent Elements in Claims and Parts in Preferred Embodiments In the following paragraphs, non-limiting examples of correspondences between various elements recited in the claims below and those described above with respect to various preferred embodiments of the present invention are explained.

In the above-mentioned embodiment, the moving device 200 is an example of a moving device or an autonomous moving device, the navigation apparatus 100 is an example of a navigation apparatus, and the path detector 150 is an example of a path detector. The destination positional information acquirer 140 is an example of a destination positional information acquirer, the topographical characteristics information acquirer 160 is an example of a topographical characteristics information acquirer, the storage portion 130 is an example of a storage portion of the navigation apparatus, and the worth estimator 170 is an example of a worth estimator.

The component in the column direction of the first variable matrix X is an example of a first variable, the component in the row direction of the first coefficient matrix 'a' is an example of a first coefficient, and the first function x is an example of a first function. The component in the column direction of the second variable matrix Y is an example of a second variable, the component in the row direction of the second coefficient matrix b is an example of a second function, and the second function Y is an example of a second function.

The path selector 180 is an example of a path selector, the operation portion 120 is an example of an operation portion, the position orientation sensor 111 is an example of a position orientation sensor, the environment recognition sensor 112 is an example of an environment recognition sensor. The storage portion 330 is an example of a storage portion of a simulation apparatus, the virtual moving device 1 is an example of a virtual moving device, the worth calculator 350 is an example of a worth calculator, and the information acquirer 360 is an example of an information acquirer. The weight information calculator 370 is an example of a weight information calculator, the vehicle body 240 is an example of a main body, and the controller 210 is an example of a controller.

As each of constituent elements recited in the claims, various other elements having configurations or functions described in the claims can be also used.

INDUSTRIAL APPLICABILITY

The present invention can be effectively utilized for various autonomous mobile objects including navigation apparatuses.

The invention claimed is:

1. A navigation apparatus for use in a moving device, comprising:
   a hardware processor, and
   a non-transitory storage medium having program instructions stored thereon, execution of which by the hardware processor causes the navigation apparatus to provide functions of:
      a path detector that detects one or a plurality of paths through which the moving device is capable of moving;
      a destination positional information acquirer that acquires information regarding a position of a destination of the moving device as destination positional information;
      a topographical characteristics information acquirer that acquires information regarding characteristics of topography in surroundings of the moving device as topographical characteristics information;
      a storage portion that stores weight information including a plurality of weight coefficients respectively corresponding to the destination positional information and the topographical characteristics information; and
      a worth estimator that
         calculates worth correlation information regarding the one or plurality of paths to the destination using the acquired destination positional information, the acquired topographical characteristics information, and the stored weight information, and
         estimates a worth score for each of the one or plurality of paths to the destination based on the calculated worth correlation information, a higher worth score corresponding to a higher probability for the moving device to move to the destination,
      wherein the plurality of weight coefficients in the weight information are calculated by a canonical correlation analysis using a plurality of pieces of destination positional information each regarding a position of an arbitrary destination with respect to an arbitrary point, a plurality of pieces of topographical characteristics information regarding characteristics of topography in surroundings of the arbitrary points, and a worth score of each of a plurality of paths that are acquired in advance in virtual topography, the acquired plurality of paths including the plurality of paths detected by the path detector.

2. The navigation apparatus according to claim 1, wherein the plurality of weight coefficients in the weight information are calculated by
   setting a first function that includes
      a plurality of first variables including the plurality of pieces of destination positional information and the plurality of pieces of topographical characteristics information, and
      a plurality of first coefficients respectively corresponding to the plurality of first variables, setting a second function that includes
- one or a plurality of second variables including the worth score of each of the acquired plurality of paths to the destination in the virtual topography, and
- one or a plurality of second coefficients respectively corresponding to the one or plurality of second variables, determining numerical values of the plurality of first coefficients and numerical values of the one or plurality of second coefficients, such that a correlation between a numerical value of the first function and a numerical value of the second function is maximized, and including the determined numerical values of the plurality of first coefficients as the plurality of weight coefficients in the weight information.

3. The navigation apparatus according to claim 1, wherein the execution of the program instructions by the hardware processor causes the navigation apparatus to further provide functions of a path selector that selects a path having a highest worth score among the worth scores estimated by the worth estimator.

4. The navigation apparatus according to claim 1, further comprising
a position orientation sensor that receives positioning information of the moving device from a global positioning system,
wherein the execution of the program instructions by the hardware processor causes the navigation apparatus to further provide functions of an operation portion operated by a user in order to designate the position of the destination, wherein
the destination positional information acquirer acquires the destination positional information based on the position of the destination designated by the operation portion and the positioning information of the moving device received from the position orientation sensor.

5. The navigation apparatus according to claim 1, further comprising an environment recognition sensor that measures a first number of points in surroundings of the moving device, wherein
the path detector detects the one or plurality of paths through which the moving device is capable of moving based on the first number of information of measurement respectively corresponding to the first number of points by the environment recognition sensor, and
the topographical characteristics information acquirer extracts a second number, smaller than the first number, of information of measurement of the one or plurality of paths from the first number of the information of measurement as the topographical characteristics information.

6. The navigation apparatus according to claim 5, wherein the environment recognition sensor includes a laser range finder.

7. The navigation apparatus according to claim 1, wherein a higher worth score of a path to the destination corresponds to a shorter moving time period in which the moving device moves through the path.

8. The navigation apparatus according to claim 1, wherein a higher worth score of a path to the destination corresponds to a smaller amount of energy consumption by which the moving device moves through the path.

9. The navigation apparatus according to claim 1, wherein the weight information stored in the storage portion is generated by a simulation apparatus that includes
another hardware processor, and
another non-transitory storage medium having another set of program instructions stored thereon, execution of which by the another hardware processor causes the simulation apparatus to provide functions of:
- another storage portion that stores topographical data indicating virtual topography including the plurality of paths;
- a virtual moving device capable of traveling on the plurality of paths in the virtual topography indicated by the topographical data;
- a worth calculator that acquires the worth score for each of the plurality of paths by moving the virtual moving device from the arbitrary point to the arbitrary destination in the virtual topography, and calculates a worth score of a most suitable path to the arbitrary destination based on the acquired worth scores of the plurality of paths, the most suitable path being a path through which the moving device moves to the arbitrary destination with a highest probability;
- an information acquirer that acquires the plurality of pieces of destination positional information regarding a position of the arbitrary destination with respect to the arbitrary point and the plurality of pieces of topographical characteristics information regarding characteristics of topography in surroundings of the arbitrary point in the virtual topography; and
- a weight information calculator that calculates the weight information by the canonical correlation analysis using the worth score of the most suitable path calculated by the worth calculator regarding each of the plurality of destinations, and the plurality of pieces of destination positional information and the plurality of pieces of topographical characteristics information that are acquired by the information acquirer, wherein
the weight information includes the plurality of weight coefficients respectively corresponding to the destination positional information and the topographical characteristics information.

10. The simulation apparatus according to claim 9, wherein the weight information calculator calculates the weight information by
setting a first function that includes
- a plurality of first variables including the plurality of pieces of destination positional information and the plurality of pieces of topographical characteristics information, and
- a plurality of first coefficients respectively corresponding to the plurality of first variables, setting a second function that includes
- one or a plurality of second variables including the worth score of each of the acquired plurality of paths to the destination in the virtual topography, and
- one or a plurality of second coefficients respectively corresponding to the one or plurality of second variables, determining numerical values of the plurality of first coefficients and numerical values of the one or plurality of second coefficients, such that a correlation between a numerical value of the first function and a numerical value of the second function is maximized, and including the determined numerical values of the plurality of first coefficients as the plurality of weight coefficients in the weight information.

11. An autonomous moving device comprising:
a main body configured to be movable; and
the navigation apparatus according to claim 1 disposed in the main body; and
a controller including a hardware processor that is configured to execute instructions to control movement of the main body based on the worth score of each path to the destination estimated by the navigation apparatus.

12. A navigation method for a navigating apparatus of a moving device, the navigating apparatus including a hardware processor and a storage device, the method comprising:
  obtaining weight information that includes a plurality of weight coefficients, and storing the weight information in the storage device;
  detecting, by the hardware processor, one or a plurality of paths through which the moving device is capable of moving;
  acquiring, by the hardware processor, information regarding a position of a destination with respect to the moving device as destination positional information;
  acquiring, by the hardware processor, information regarding characteristics of topography in surroundings of the moving device as topographical characteristics information; and
  calculating, by the hardware processor, worth correlation information regarding the one or plurality of detected paths to the destination using the acquired destination positional information, the acquired topographical characteristics information and the stored weight information, and estimating a worth score of each of the one or plurality of paths to the destination based on the calculated worth correlation information, wherein the plurality of weight coefficients in the weight information are calculated by a canonical correlation analysis using a plurality of pieces of destination positional information each regarding a position of an arbitrary destination with respect to an arbitrary point, a plurality of pieces of topographical characteristics information regarding characteristics of topography in surroundings of the arbitrary points, and a worth score of each of a plurality of paths that are acquired in advance in virtual topography, the acquired plurality of paths including the plurality of paths detected by the path detector.

* * * * *